(12) United States Patent
Plesniak et al.

(10) Patent No.: US 6,927,886 B2
(45) Date of Patent: Aug. 9, 2005

(54) RECONFIGURABLE IMAGE SURFACE HOLOGRAMS

(75) Inventors: Wendy J. Plesniak, Cambridge, MA (US); Michael W. Halle, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 10/211,042

(22) Filed: Aug. 2, 2002

(65) Prior Publication Data

US 2004/0021917 A1 Feb. 5, 2004

(51) Int. Cl.$^7$ ............................. G03H 1/08; G03H 1/26; G02B 27/22

(52) U.S. Cl. ............................. 359/9; 359/23; 359/35; 359/900

(58) Field of Search ............................. 359/9, 23, 35, 359/900

(56) References Cited

U.S. PATENT DOCUMENTS

| | | | | |
|---|---|---|---|---|
| 4,969,700 | A | * | 11/1990 | Haines ........................... 359/9 |
| 5,076,687 | A | | 12/1991 | Adelson ..................... 356/4.04 |
| 5,237,433 | A | * | 8/1993 | Haines et al. .................. 359/9 |
| 5,561,537 | A | * | 10/1996 | Aritake et al. ................. 359/23 |
| 5,594,559 | A | * | 1/1997 | Sato et al. ...................... 359/8 |
| 6,211,848 | B1 | | 4/2001 | Plesniak et al. ............... 345/1 |

FOREIGN PATENT DOCUMENTS

WO   WO 98/10404   3/1998  ............ G09G/3/00

OTHER PUBLICATIONS

Lucente et al., "Rendering Interactive Holographic Images," Proceedings of the ACM SIGGRAPH (1995), pp. 387–394.

Wang, "Plenoptic Camera," http://www-bcs.mit.edu:16080/people/jyawang/demos/plenoptic/plenoptic.html, Jul. 24, 1997, pp. 1–5.

Burch, J.J., A Computer Algorithm for Synthesis of Spatial Frequency Filters. *Proc. IEEE 55*, 599. (1967).

Halle, M.W., The Generalized Holographic Stereogram, SM Thesis, Media Arts and Sciences Section, Massachusetts Institute of Technology. (1991).

Underkoffler, J.S., *Toward Accurate Computation of Optically Reconstructed Holograms*. SM Thesis, Media Arts and Sciences Section, Massachusetts Institute of Technology. (1991).

St.–Hilaire, P., Scalable Optical Architectures for Electronic Holography, Ph. D. Thesis, Program in Media Arts and Sciences, Massachusetts Institute of Technology, (1994).

(Continued)

*Primary Examiner*—John Juba, Jr.

(57) ABSTRACT

The invention provides systems and methods for generating and displaying computational holographic stereograms having a hologram surface and a spatially distinct image surface. A three-dimensional object or scene is captured or synthesized as a stack of views. The holographic stereogram is computed by obtaining a diffractive fringe vector e and a pixel slice v through the stack of views, and generating the holopixel representation f=ev. The holographic stereogram is displayed using one or more image surfaces that are spatially distinct from the hologram surface. the surfaces can be any two-dimensional structures defined on a three-dimensional space, including, but not limited to planar, cylindrical, spherical, or other surfaces. The holographic stereograms are adjustable through variations in an image surface depth, an image surface resolution, a number of image surfaces, and a scene parallax resolution.

20 Claims, 18 Drawing Sheets

OTHER PUBLICATIONS

Chai, J–X, Tong, X., Chan, S–C., and Shum, H., "Plenoptic Sampling," Proceedings of SIGGRAPH 2000, Computer Graphics Proceedings, Annual Conference Series, pp. 307–318, Jul. 2000.

Halle, M., "Autostereoscopic Displays and Computer Graphics," Computer Graphics, ACM SIGGRAPH, vol. 31, No. 2 (1997) pp. 58–62.

Halle, M., "Multiple Viewpoint Rendering," ACM 1998 (www.media.mit.edu/~halazar/sig98/halle98.pdf).

Halle, M.W., "Holographic stereograms as discrete imaging systems," in S.A. Benton, ed., Proc. SPIE vol. #2176: Practical Holography VIII, (Feb. 1994) pp. 73–84.

Halle, M.W., "Multiple Viewpoint Rendering for 3–Dimensional Displays," Ph.D. Thesis, Program in Media Arts and Sciences, Massachusetts Institute of Technology, (1997).

Halle, M.W. Benton, S.A., Klug, M.A., Underkoffler, J.S., "The Ultragram: A Generalized Holographic Stereogram," in: S.A. Benton, ed., Proc. SPIE vol. 1461, Practical Holography V (Feb. 1991) pp. 142–155.

Lucente, M., "Interactive Computation of Holograms using a Look–up Table." Journal of Electronic Imaging, vol. 2, No. 1, (1993) (http://web.media.mit.edu/~lucente/pubs/jei92.html).

Lucente, M., Galyean, T., "Rendering Interactive Holographic Images". Proceedings of the ACM SIGGRAPH (1995), pp. 387–394 (incomplete html version).

Plesniak, W.J., "Haptic holography: an early computational plastic," PhD Thesis, Program in Media Arts and Sciences, Massachusetts Institute of Technology. (2001).

St–Hilaire, P., Benton, S.A., Lucente, M., Jepsen, M.L, Kollin, J., Yoshikawa, H., and Underkoffler, J.S., "Electronic display system for computational holography," Proc.SPIE vol. 1212, Practical Holography IV. (1990) (http://www.media.mit.edu/~wjp/RIP/st90holovideo.pdf).

Underkoffler, J.S., "Occlusion Processing and Smooth Surface Shading for Fully Computed synthetic Holography," Proc. SPIE vol. 3011, p. 53–60, Practical Holography XI and Holographic Materials III, Stephen A. Benton; T. John Trout; Eds. (1997).

van Nuland, E., "Solid State Volumetric Display Projecting 3D Objects in Space," Proc.SPIE, vol. 4297, Stereoscopic Displays and Virtual Reality Systems VIII (2001) (http://ericespace.com/DDD/Appendix_archivos/4297A–29.pdf) and Technical Conference Agenda (http://www.spie.org/web/meetings/programs/pw01/confs/4297A.html).

McMillan, L. and Bishop, G., "Plenoptic Modeling: An Image–Based Rendering System" Proceedings of SIGGRAPH, Los Angeles, CA Aug. 1995.

* cited by examiner

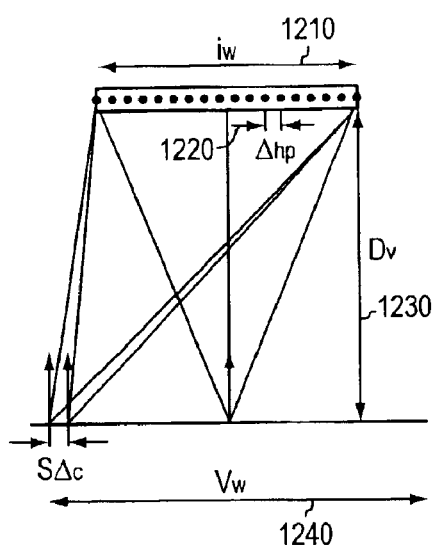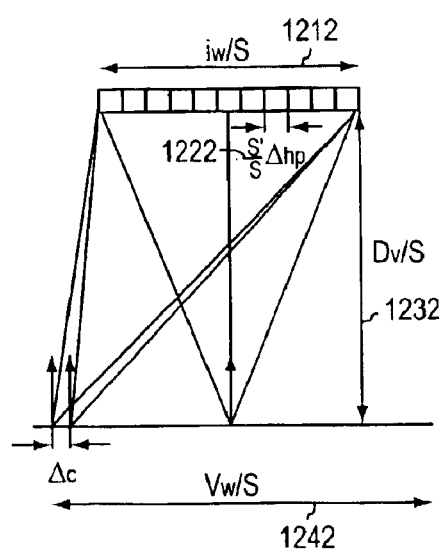
FIG. 12A
FIG. 12B

RECONFIGURABLE IMAGE SURFACE HOLOGRAMS

FIELD OF THE INVENTION

This invention relates generally to computed holographic stereograms. More particularly, the invention relates to computed holographic stereograms having an image surface that is spatially distinct from the surface on which the holographic stereogram is written or recorded.

BACKGROUND OF THE INVENTION

Holography is a display technology in which a viewer sees a scene that varies as the angle at which the viewer views the scene changes. An example of a conventional hologram that is now in common use is the small image that is often imbedded in the front surface of a credit card. In that usage, the hologram is provided as a security or anti-counterfeiting, device, because of the difficulty involved in producing a hologram.

A great deal of information is required to describe a visually complicated three-dimensional scene over a reasonable angle of view. In practical holography systems, one has only a limited amount of hologram bandwidth in which to encapsulate this information. Therefore, techniques for holographic stereogram computation seek to sample the scene minimally, and encode this information holographically using some efficient scheme (often involving a table of precomputed diffractive patterns). Conventional stereogram computation techniques employ a fixed capture and projection geometry, and fixed spatial and parallax resolutions for any three-dimensional scene to be captured and processed for display. However, a three-dimensional image that is distorted, has aberrations, or is otherwise unconvincing is obtained if one fails to adjust various parameters such as the capture and image plane positions, capture and projection spatial resolution, and number of views used to sample the scene (parallax resolution).

FIG. 1 is a schematic flow diagram of the computation process that is performed in preparing a conventional computed stereogram of the prior art. A realistic three-dimensional image of a three-dimensional object or scene (generally referred to as a "target") is to be displayed to a viewer of the projected holographic stereogram. In overview, the holographic stereogram is created by capturing (or synthesizing) a number of horizontal parallax only (HPO) views of the three-dimensional object, the number of views given by an integer n, as shown in box 102. One requirement imposed in conventional computed stereogram technology is matching of the rendering and projection geometries. The next step, represented by box 104, is computation of one basis fringe for each view direction, so that n basis fringes are computed. The computed stereogram is assembled as indicated in box 106, in an iterative process wherein a pixel vector p having components $p_i$ is retrieved by taking a slice through the image volume. The vector components $p_i$ are used to scale each basis fringe $b_i$, and the resulting sum is assigned to a hologram element (called a holopixel) h, as shown in equation (1). In the notation used here, vectors are represented by boldface symbols.

$$h = \sum_i^M p_i b_i \quad (1)$$

Finally, the holopixels are normalized to fit the available bit depth of the digital store or frame buffer.

Computational holography techniques have followed one of two general directions. A first method, fully-computed holograms, involves interference modeling of scenes populated by holographic primitives. A second approach, conventional computed holographic stereograms, involves parallax displays optically similar to holographic stereograms. In the fully-computed technique, the holographic pattern depends on the scene geometry. The three-dimensional geometry itself is populated with primitives such as spherical or cylindrical emitters. The emitter interference with a reference wave is computed to generate the hologram. A hologram computed in this fashion exhibits accurate reconstruction throughout the scene volume. However, its underlying diffractive structure is not useful to project any other scene geometry. The full computation must be done afresh every time changes in the scene texture, shading, or geometry occur. In the interest of efficiency, algorithms have been described to make this recomputation less burdensome, by using table lookup for instance, or by making incremental changes to the hologram.

In computational holography the conventional stereogram technique offers a fixed holographic "screen" through which any scene geometry is multiplexed, i.e., a multiple number of views of the scene, each from a different direction, are superimposed. Accordingly, once fixed, the conventional stereogram technique lacks configurability. Conventional stereograms typically affix the projection plane to the hologram plane and use a precomputed set of basis fringes to multiplex parallax views. The holopixels are arrayed on the hologram plane in an abutting fashion. This technique tends to introduce artifacts into the diffracted field from the basis fringes themselves, and the phase discontinuities between them.

SUMMARY OF THE INVENTION

In the methods and systems of the reconfigurable image surface holograms of the present invention, many parameters and their effects, as represented by viewable images, are adjustable. In particular, as is explained in detail below, an image surface is spatially distinct from the hologram surface of the computed holographic stereograms, according to the principles of the invention. In addition, a plurality of image surfaces, at least one of which is distinct from the hologram surface, can be employed, according to principles of the invention. The viewable holographic stereograms are reconfigurable as a consequence of the selection of the number and position of image surfaces. In addition, some of the image characteristics of the holographic stereograms can be controlled and optimized. For example, some artifacts that appear in holographic stereograms of the prior art are due in part to errors in focus or bandlimiting relating to the distance of a portion of the scene from the image surface. With a plurality of adjustable image planes, one can select positions that minimize or eliminate such artifacts. In addition, by relaxing the requirement that the elements of the holographic stereogram are abutting, the systems and methods of the invention provide a mechanism for reducing artifacts caused by abrupt changes in adjacent elements of the holographic stereo gram.

The present invention provides at least five advantages in the areas of spatial display and hologram computation. First and most generally, in this type of holographic stereogram, the geometry of optical projection is specified by a single diffractive pattern and can be adjusted computationally. For a given image plane depth, all holopixels are represented by the same precomputed elemental diffraction pattern (fringe). The elemental fringe can be computationally adjusted to adjust the optical reconstruction of the holopixels themselves. Fundamental display reconfiguration can be performed under software control. Other existing stereogram computation and electronic display techniques use a fixed projection geometry.

Second, the location, size, and resolution of the image plane are variable. As implied above, this flexibility allows one or more image planes (the plane of highest spatial reconstruction accuracy) to be positioned anywhere in the image volume, so long as an image plane is spatially distinct from the hologram plane. The design also permits the image plane's size and holopixel resolution to be adjusted for a given three-dimensional scene. Again, other existing stereogram computation and electronic display techniques use a fixed image plane depth and resolution. Third, scene parallax resolution is also variable. Like other stereogram techniques, this approach reconstructs a three-dimensional scene using a series of rendered or otherwise captured two-dimensional parallax views. Unlike other stereogram techniques, the computation of holograms in accordance herewith does not require that a given parallax sweep contain a fixed number of views, but rather allows the number of views to be adjusted for optimal reconstruction. For instance, one might employ relatively few parallax views for a shallow scene, and substantially more views to reconstruct a deep scene without aliasing artifacts.

Fourth, instances of the precomputed diffractive pattern used to reconstruct holopixels in an image plane are prefiltered and then overlapped on the hologram, to eliminate diffraction artifacts in reconstruction. The precomputed pattern may be modeled in a variety of ways to adjust the image and projection characteristics of each reconstructed holopixel.

Fifth, the hologram format of the present invention permits the display of one or multiple image surfaces. A given electro-holographic display architecture can mimic a volumetric display, a stereographic display, or an interesting hybrid of the two. This format provides a rich testbed for, e.g., comparing these different display types and their underlying representation and reconstruction of light fields.

Adjustments to all parameters listed above can be made computationally to meaningfully change the behavior of the holographic display, and thereby the character of its reconstructed image. The basic method is also suitable for hardware implementation. In hologram computation according to the present invention, instances of an appropriate fringe are arrayed spatially, according to the holopixel locations, scaled in amplitude by scene parallax information, and accumulated into a composite pattern. Thus, basic hologram computation may be accomplished as one vector multiplication (to scale the fringe) and one vector addition (to accumulate the scaled fringe into the hologram) per holopixel. Normalizing the final hologram can be accomplished with simple bit shift operations, though a more careful approach generally yields better results.

In one aspect, the invention features a computer-generated holographic stereogram including a hologram surface on which interference patterns are produced. The interference patterns reconstruct an image surface that is spatially distinct from the hologram surface, through which an image is projected. In one embodiment, the hologram surface and the image surface are separated by an adjustable distance. The image surface may be a variable depth and/or resolution. Moreover, a scene parallax resolution may be variable. In one embodiment, the image is displayed (e.g., in color) using visible light.

In another aspect, the invention relates to a computer-generated holographic stereogram having an optical-projection geometry subject to computational adjustment for controlling a visual manifestation of the holographic stereogram. In one embodiment, the optical projection geometry subject to computational adjustment includes an image surface depth, an image surface resolution, a number of image surfaces, and/or a scene parallax resolution.

In still another aspect, the invention features a computer-readable medium having recorded thereon a diffractive pattern for optically reconstructing a holographic stereogram. The diffractive pattern includes a plurality of precomputed diffractive bases used to reconstruct holographic pixels in at least one image surface of the holographic stereogram. The holographic stereogram has a hologram surface that is spatially distinct from an image surface. In some embodiments, the precomputed diffractive bases are individually weighted. Two of the precomputed diffractive bases may overlap.

In a further aspect, the invention relates to an apparatus for displaying computer-generated holographic stereograms. The apparatus includes a computer for generating a computed holographic stereogram, a display having a hologram surface on which the holographic stereogram is written, and a generating module that reconstructs the holographic stereogram at an image surface that is spatially distinct from the hologram surface. In one embodiment, the generating module controls a parameter that adjusts a visual manifestation of the holographic stereogram. The controlled parameter includes an image surface depth, an image surface resolution, a number of image surfaces, and/or a scene parallax resolution.

In yet another aspect, the invention features an apparatus for displaying computer-generated holographic stereograms. The apparatus includes a computer for generating a computed holographic stereogram, a display upon which a holographic stereogram is displayable, and a generating module that generates a diffractive pattern including a plurality of precomputed diffractive bases used to reconstruct holographic pixels in one or more image surfaces of the holographic stereogram. In one embodiment, the precomputed diffractive bases are individually weighted. In one embodiment, two of the precomputed diffractive bases overlap.

In an additional aspect, the invention relates to a method of displaying a computer-generated holographic stereogram, including the steps of computationally generating a diffractive pattern for displaying a holographic stereogram, producing the diffractive pattern to image at least one image surface at a location that is spatially distinct from a hologram surface, and displaying the resulting holographic stereogram to reconstruct at least one image surface. In one embodiment, the method further includes the step of adjusting a location of at least one image surface relative to a location of the hologram surface.

In a still further aspect, the invention relates to a method of displaying an adjustable computer-generated holographic stereogram, including the steps of computationally generating a diffractive pattern for displaying a holographic stereogram, determining a visual manifestation of the holographic stereogram by adjustment of an adjustable parameter associated with the diffractive pattern of the holographic stereogram, and producing the holographic stereogram on an image surface. In one embodiment, the adjustable parameter is an image surface depth, an image surface resolution, a number of image surfaces, or a scene parallax resolution.

In a further aspect, the invention features a method of displaying a computer-generated holographic stereogram, including the steps of computationally generating a holographic stereogram using a diffractive pattern that includes a plurality of precomputed diffractive bases that are individually weighted and overlap. The precomputed diffractive bases are used to reconstruct holographic pixels in at least one image surface. The method includes displaying the resulting holographic stereogram to reconstruct the image surface(s).

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIGS. 12A–12B are diagrams showing the scaling relations between a projection geometry and a capture geometry, according to principles of the invention;

DETAILED DESCRIPTION

The systems and methods of the invention will be described first in high level overview, in order to familiarize the reader with the features of the invention. Thereafter, the systems and methods will be described in greater technical detail. Some of the advantages and illustrative examples of the systems and methods of the invention will then be given.

Figure 1:
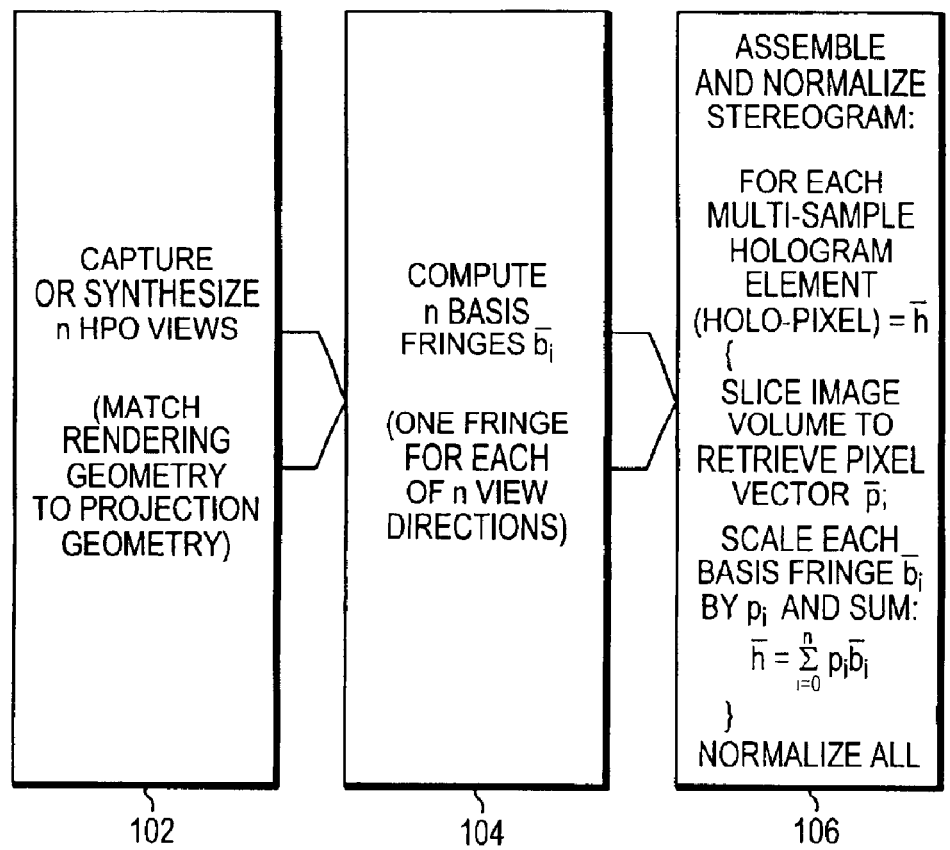
FIG. 1 is a schematic flow diagram of the computation process that is performed in preparing a conventional computed stereogram of the prior art.
Figure 2:
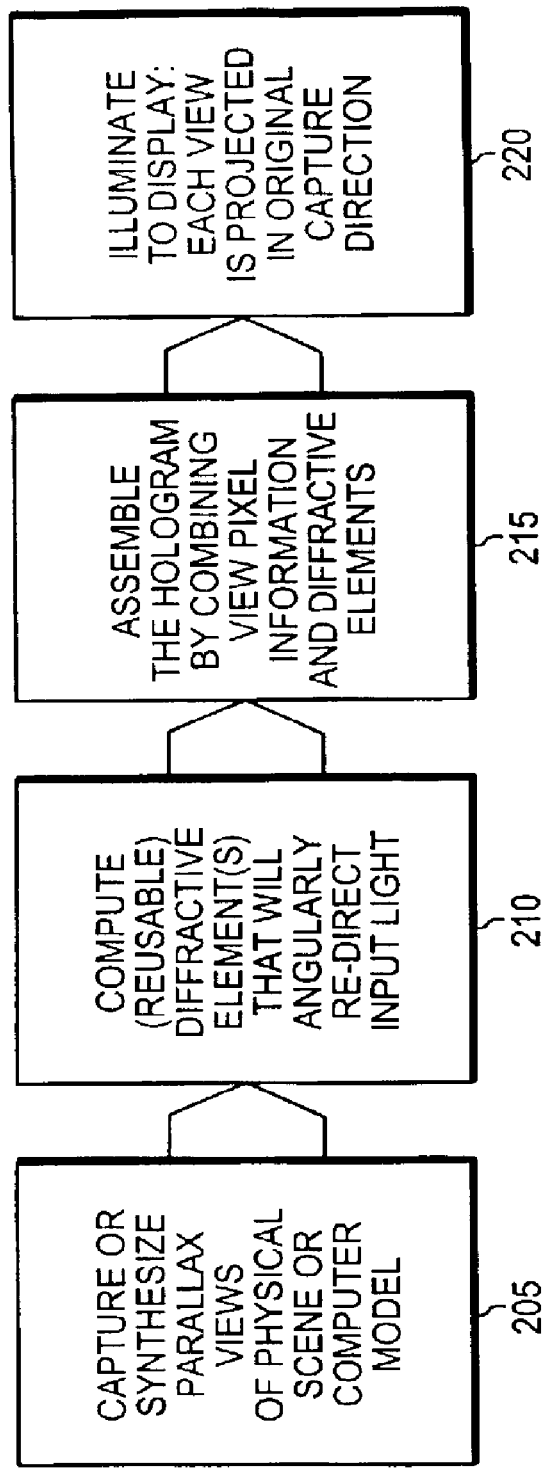
FIG. 2 is a schematic flow chart that depicts in generalized form the process of computing and displaying a conventional holographic stereogram.

FIG. 2 depicts in generalized form the process of computing and displaying a conventional holographic stereogram. In one embodiment, the systems and methods of the invention involve the operations shown in FIG. 2, each of which may involve discrete steps. A first operation is the capture (or synthesis) of a plurality of two-dimensional images of a three-dimensional object or scene, more generally a three-dimensional target, which is to be depicted holographically, as indicated in box 205. A second operation is the computation of diffractive elemental fringes that angularly redirect input light, as indicated in box 210. A third operation is the computational generation of an interference pattern using the precomputed diffractive fringes and the information in the two-dimensional images, as indicated in box 215. A fourth operation is the display of a holographic image by shining light through the computer-generated interference pattern, which results in projecting each view in the original capture direction of that view, as indicated at box 220. The holographic image has the property that as the viewer changes his or her view direction, the image seen by the viewer appears to change as it would if the viewer moves relative to an actual three-dimensional object.

Figure 3:
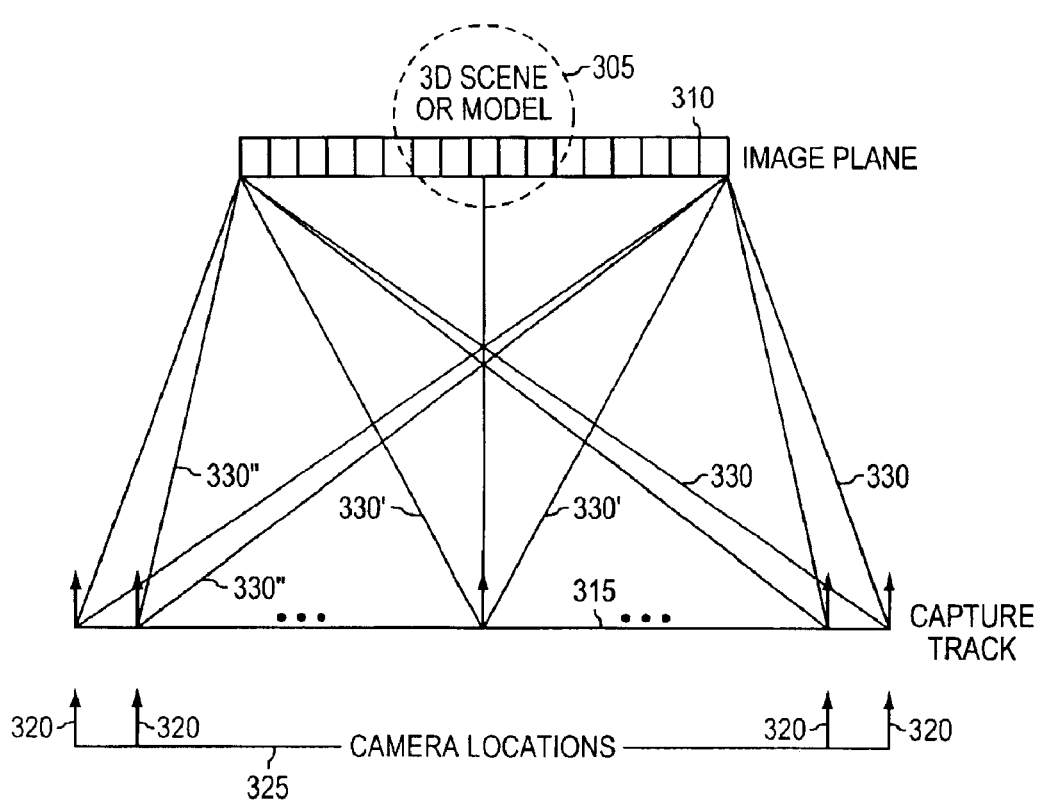
FIG. 3 is a schematic plan diagram showing the capture geometry and process of the prior art.

FIG. 3 shows one illustrative example of the capture geometry and process of the conventional holographic stereogram. A three-dimensional scene or model (e.g., the target) 305, illustrated generally by a dotted circle or oval, is present. An illustrative image plane 310 is defined in the vicinity of the target 305. In FIG. 3, the image plane 310 intersects the target 305. A capture track 315, running generally parallel to the image plane 310, is also defined. The target 305 is a real three-dimensional object or scene, and the capture mechanism is the use of a camera sensitive to the illumination used to illuminate the target 305, and capable of being positioned along the capture track at locations 320 indicated in FIG. 3 as camera locations. The line 325 along which the camera locations are indicated is parallel to the capture track 315, but in fact, the camera locations are on a line coincident with the capture track 315. Pairs of lines 330, 330', 330" and so forth are shown in FIG. 3 to indicate the angle of view that the camera "sees" when it is capturing two-dimensional images of the target 305 as the target is projected at the image plane 310 from different camera locations along the capture track 315. The view represented by the lines 330, for example, is different from the view represented by the lines 330".

Figure 4:
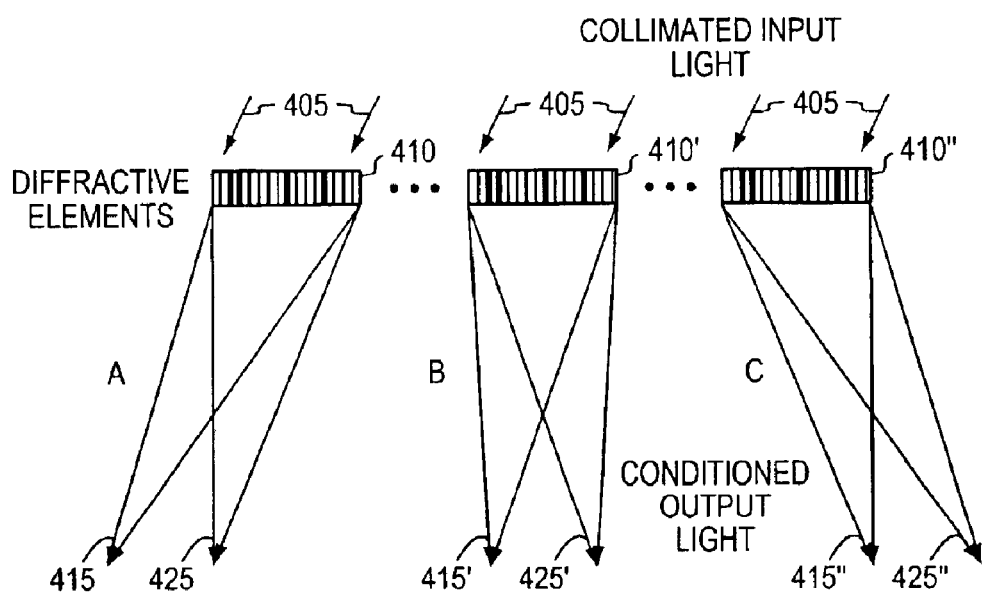
FIGS. 4A–4C are schematic diagrams that depict a conventional computed diffractive element array that redirects light.

FIGS. 4A–4C depict an illustrative computed diffractive element array that redirects light. Collimated input light 405 coming from the same direction impinges on the diffractive element array in each of FIGS. 4A–4C. Diffraction of electromagnetic radiation is a well-known general phenomenon, expressed by the Bragg diffraction condition $n\lambda = 2d \sin \theta$, where n is an integer referred to as the diffraction order, $\lambda$ is the wavelength of the radiation, d is a spacing of a diffractive array, and $\theta$ is an angle of diffraction. The diffractive element 410 of FIG. 4A is adapted to diffract the light to impinge on a series of locations situated between positions 415 and 425, as shown. In FIG. 4B, the diffractive elements 410' are adapted to diffract the impinging light at a different angular range such that the light impinges at positions in the locations from 415' to 425'. In FIG. 4C, the diffractive elements 410" are disposed so as to diffract the light to the locations between the positions 415" to 425".

Figure 5:
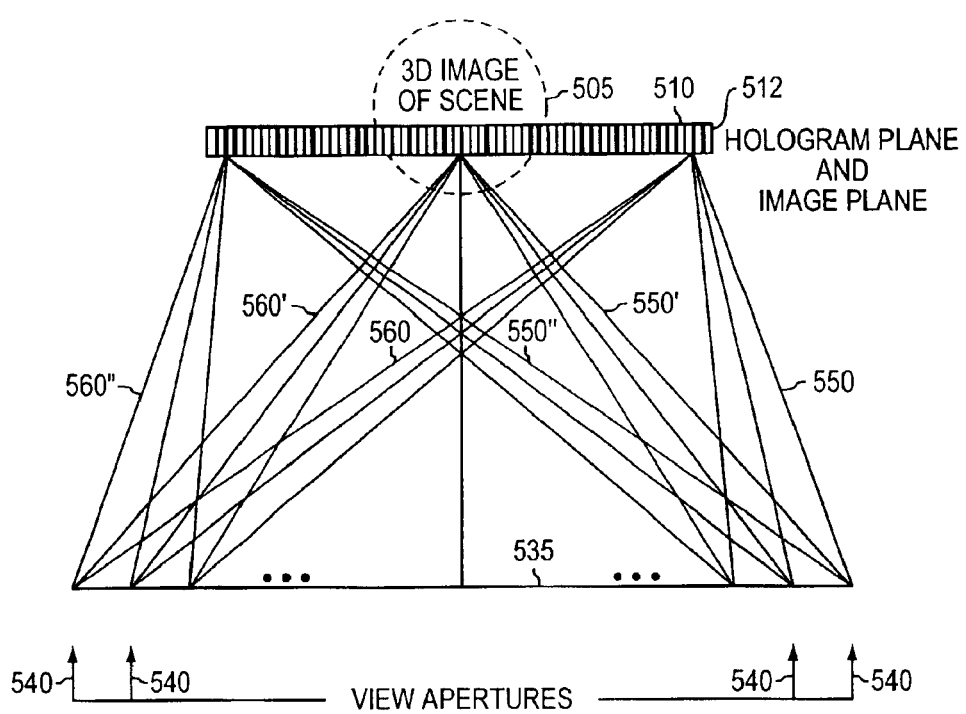
FIG. 5 is a schematic diagram showing the geometry of the display technology for stereographic projection of the prior art.

FIG. 5 illustrates the geometry of the display technology for stereographic projection of the prior art. In FIG. 5 a three-dimensional image or scene 505 is displayed. A hologram plane 510 and a single image plane 512 are collocated at a plane intersecting the three-dimensional image 505. Alternatively, the single image plane 512 is located at an infinite distance from the hologram plane, and would not appear in FIG. 5 at all.

In overview, a holographic stereogram according to principles of the invention includes a surface upon which the hologram's interference patterns appear, which will be referred to as the "hologram surface." In addition, a holographic stereogram according to principles of the invention includes a surface upon which the image information from the stereogram is, or appears to be, focused, which will be referred to as the "image surface" or the "projection surface." The systems and methods of the invention have as one of their features a hologram surface that is spatially distinct from an image surface in contrast to the prior art geometry shown in FIG. 5. If there is more than one image surface, a situation different from the single image plane shown in FIG. 5, one image surface can be collocated with the hologram surface, so long as at least one image surface is spatially distinct from the hologram surface.

The surfaces can be surfaces of any type, which will be understood to mean two-dimensional structures in a three-dimensional space, including but not limited to planar surfaces (planes and segments of planes), curved surfaces such as cylindrical sections, spherical sections, surfaces of revolution, polygonal surfaces, and arbitrary two-dimensional surfaces. For convenience of exposition, the description of aspects and features of embodiments of the invention will be presented in terms of planar surfaces. Those of skill in the mathematical arts will recognize that there are many mathematical transforms, for example from the field of complex variables, that permit the straightforward transformation of a system described in planar coordinates into systems expressed in cylindrical, spherical and other coordinate systems, as well as the reverse transformations. Furthermore, as is recognized in the mathematical transformation arts, a first coordinate system, such as cylindrical coordinates, can be converted to a second coordinate system, such as spherical coordinates, by transforming the system in cylindrical coordinates to a system in orthogonal Cartesian coordinates, and then applying the transform to convert the system in Cartesian coordinates into the system in spherical coordinates. Alternatively, the two (or more) transformations can be combined into a direct transformation using, for example, matrix mathematics in three dimensions.

The capture operation involves obtaining two-dimensional images of the three-dimensional target. The Nyquist sampling condition requires that the frequency of sampling be at least twice the spatial or temporal frequency of the most quickly changing portion of the target if one wishes to avoid aliasing, as is well known to those skilled in the data processing arts. The captured two-dimensional images are digitized, for example by being captured electronically and processed with an analog-to-digital converter, permitting the intensities and/or colors of individual pixels to be determined and recorded in a machine-readable medium, such as a computer memory or a recording medium such as floppy or hard disk, or CD-ROM. Alternatively, a three-dimensional model or a rendition of an object by an artist can be used to obtain a representation of the object in a three-dimensional computer modeling application, which representation can be processed to obtain the requisite two-dimensional images.

Figure 6:
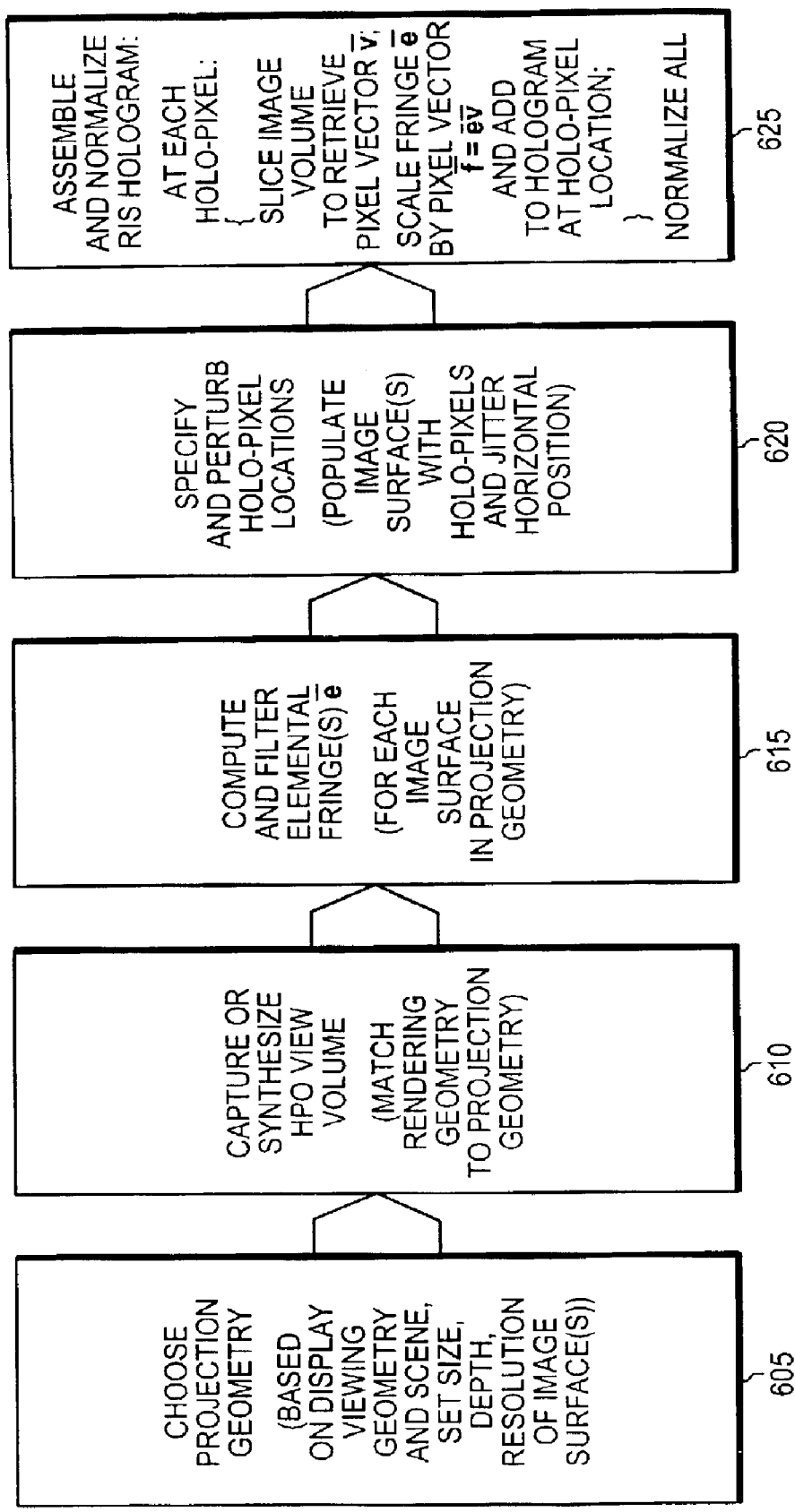
FIG. 6 is a schematic flow diagram of an illustrative embodiment of the Reconfigurable Image Surface (RIS) hologram computation, according to principles of the invention.

FIG. 6 is a schematic flow diagram of an illustrative embodiment of the process of the invention in generating reconfigurable image surface (RIS) holograms. A projection geometry is first selected, as indicated at box 605. The selection is based on the display viewing geometry and scene, the set size, the image depth, and the resolution of image surfaces. In the present embodiment, as indicated in box 610, the view volume or target is captured or synthesized using a HPO approach, in which the rendering geometry is matched to the projection geometry. Other embodiments can use view volumes including more than only horizontal parallax. The target can be a real three-dimensional object, a computer generated virtual three-dimensional object, or a rendering of a three-dimensional object, such as a model. For example, if a representation of President Abraham Lincoln in a holographic stereogram were desired, one could capture images in any of several ways. A system such as lidar, that records topographic features of a target, could be used to scan the likeness of Lincoln at the Lincoln Memorial in Washington, D.C., from which data a plurality of two-dimensional sections, or "views," can be extracted. In another approach, a digital camera can record a sequence of two-dimensional views of the likeness of Lincoln. Alternatively, an artist can prepare a sequence of two dimensional views of Lincoln in a computer-based graphical rendering application.

As indicated at box 615, the elemental fringes for each image surface in the projection geometry, denoted by e, are computed and filtered. The locations of pixels corresponding to the holographic stereogram (called holo-pixels) are specified, the pixel at each location is defined, and the horizontal positions of the pixels are randomly jittered to eliminate effects caused by digitization of an analog image, as indicated at box 620. As indicated at box 625, the RIS hologram is assembled and normalized by slicing the image volume to retrieve pixel vectors v, scaling the elemental fringes vectors e with the pixel vectors to form the products f as represented in equation (2):

$$f = ev \qquad (2)$$

which are added to determine the value of the holo-pixels at each pixel location. The normalization is performed after all the pixels are computed.

The expression for the fringe vector e has the form shown in equation (3):

$$e(x) = \cos(2\pi/\lambda)(r(x) - x\sin\Theta_{ref} - \Phi_{random}) \qquad (3)$$

which will be discussed in greater detail below. The dependence of $e(x)$ on wavelength $\lambda$ will make clear to those of skill in the relevant optical arts that the fringe vector e will be adjustable with respect to color, among other variables. In some embodiments, the use of fringe vectors e that are adapted to display, for example, three primary colors can make possible full color holographic stereograms. For many applications, holographic stereograms are displayed using visible portions of the electromagnetic spectrum. In some embodiments, the capture operation and the display operation are performed using different portions of the spectrum.

According to the systems and methods of the invention, the two-dimensional interference patterns are computed using diffractive bases. A diffractive basis is a pattern resulting from the interference of coherent waves, and which conditions an input wave to have some specific behavior on output (such as focusing, spreading or diffusing). The summation of a plurality of diffractive bases creates a diffractive pattern. A diffractive pattern is the computational equivalent of a complex lens that angularly redirects light from a source.

As those of skill in the holographic arts will understand, an integer number n of different views can be captured, with spacing or displacement of the camera position controlled at the discretion of the system or its operator. The spacing between capture locations can be uniform or non-uniform. The capture process often will involve capturing images using visible light, but other illumination (e.g., infrared) can be used with suitable camera equipment. Two-dimensional images that record color, or more generally, variations in wavelength of the illumination, are possible by using suitable equipment such as color electronic cameras, or color recording media.

Another illustrative example of capturing images is based on a variant of the two-dimensional sequence of images obtained in computed tomography (CT) or magnetic resonance imaging (MRI). In conventional scans, three-dimensional volume information is presented to a radiologist for reading as a set of cross sections. In some cases, these slices are reconstructed into a single solid-looking image of the patient's anatomy. In the methods and systems of the invention, a modification of this medical imaging technology is used in which the original medical data is turned into n two-dimensional images corresponding to different viewpoints onto a reconstructed anatomical object. Such an embodiment would afford medical personnel a three-dimensional visualization, such as might be useful prior to performing surgery or some other invasive procedure, or for diagnosing a condition of an interior portion of the object. Still a different embodiment uses infrared illumination to capture two-dimensional images and uses visible light to display the holographic stereogram, making possible the three-dimensional visualization of targets at night or under other conditions that make normal optical visualization difficult.

The holographic stereogram image can be displayed in color, which can be useful in highlighting details or structural relations among different parts of the depicted object or objects, or which may make the image more realistic or informative. With sufficient processing power, modulation and data transfer bandwidth, the acquisition of the two-dimensional sectional images of the three-dimensional object, the computation of the elemental fringes and the combining of pixel information with the diffractive elements, and the display of the holographic stereograms of the invention can be performed in real time. In some embodiments, the illumination wavelengths used for capture and the illumination wavelengths used for display of the holographic stereogram are the same, and in other embodiments the capture wavelengths and the display wavelengths are different.

Figure 7A:
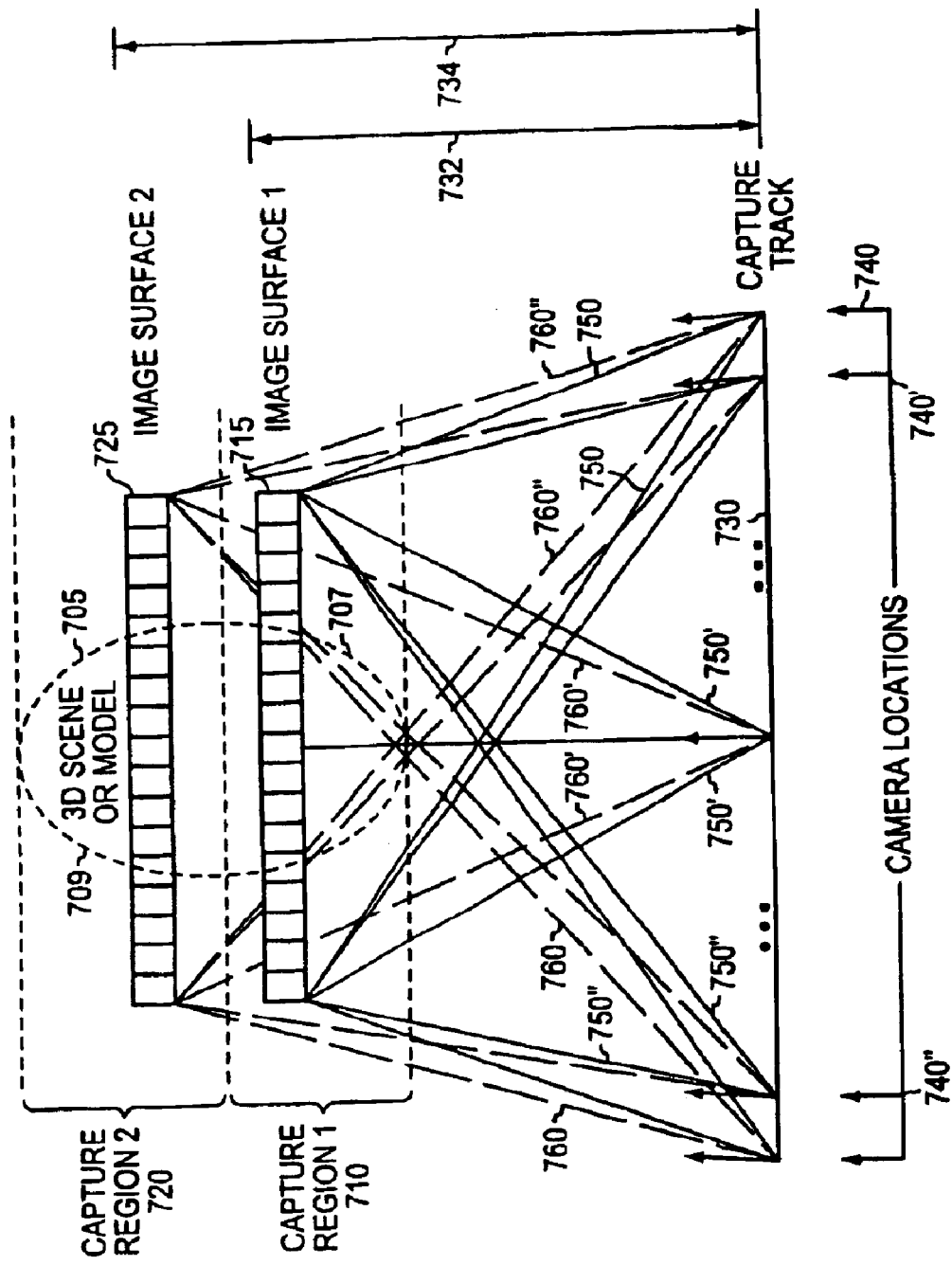
FIG. 7A is a schematic diagram in plan view showing features of a generalized RIS hologram scene capture operation, according to principles of the invention.
Figure 7B:
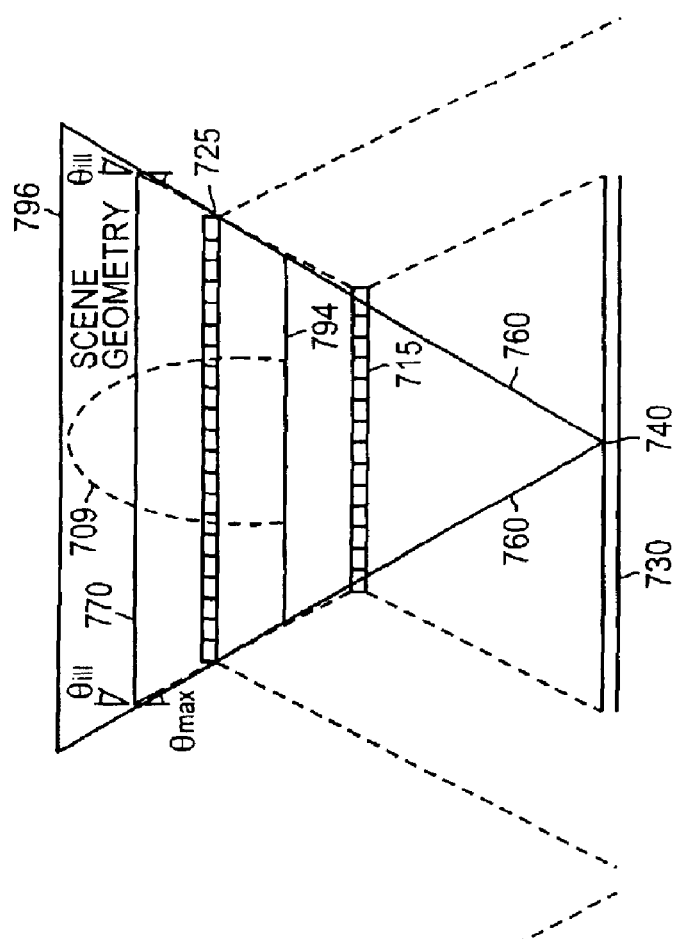
FIG. 7B is another plan view schematic diagram showing features of a RIS hologram scene capture operation using two capture planes, according to principles of the invention.
Figure 7B:
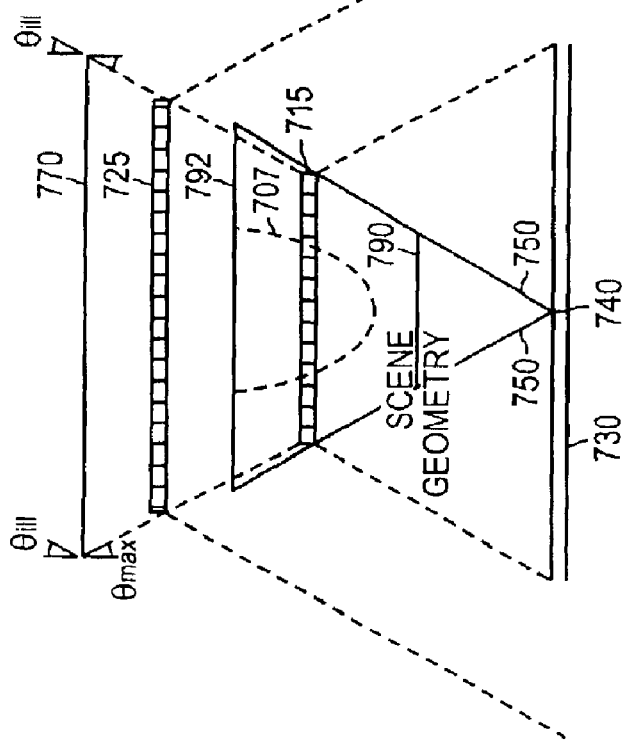

The use of multiple capture surfaces and multiple projection or image surfaces can provide improved image quality. A scene's geometrical or textural complexity can require too many captured parallax views to be efficient. In this situation, there are two options to avoid aliasing in reconstruction. One can use fewer but bandlimited captured images. One can break the scene geometry into different depth layers, and employ multiple capture passes, one per layer, as shown in FIGS. 7A and 7B. The latter approach has been described as a technique for capture in image based rendering. For display, one can use multiple image surfaces, one per layer, in projection as shown below in FIGS. 9A and 9B. The multiple image surface technique for parallax display is novel and is readily supported by the RIS hologram format.

In FIG. 7A, a three-dimensional target 705 is divided into a plurality of segments 707, 709. Segment 707 corresponds to a first capture region 710, and segment 709 corresponds to a second capture region 720. A first capture or image surface 715 is situated within the first capture region 710. A second capture or image surface 725 is situated within the second capture region 720. A capture track 730 is situated at a first distance 732 from the first image surface 715, and at a second distance 734 from the second image surface 725. The first and second distances are independently variable. The first image surface 715 and the second image surface 725 each have independently variable image surface depth, image surface size and image surface resolution. The scene parallax resolution is also variable. A plurality of camera locations 740, 740', 740"(generally 740) are defined. The number of locations 740 and the spacing between locations 740 are both variable. A camera which is not shown in FIG. 7A, such as a digital camera, records two-dimensional views of the first segment 707 (indicated by the pairs of lines 750, 750', 750") and two-dimensional views of the second segment 709 (indicated by the pairs of lines 760, 760', 760").

In FIG. 7B, as in FIG. 7A, a target is decomposed into a plurality, here two, of sections and each section is used in a separate capture process. FIG. 7B shows additional features of the capture process and system. In addition to the features described with regard to FIG. 7A, FIG. 7B depicts a hologram plane 770, the illumination angle $\Theta_{ill}$, the maximum diffracted angle $\Theta_{max}$, and clipping planes associated with each capture or image plane. The clipping planes are used to limit the depth of field that is used to capture each target segment. For the capture plane 715, which is nearer the capture track than is capture plane 725, there is a first clipping plane 790 which is nearer to the capture track and there is a second more distant clipping plane 792 that is farther from the capture track. The capture process records information about the target 707 for locations situated between the clipping planes 790 and 792 and uses that information in computing the contents of the image plane corresponding to capture plane 715. Similarly, a nearer clipping plane 794 associated with the capture plane 725 is situated at the same distance from the capture track 730 as the more distant clipping plane 792 associated with capture plane 715. The collocation of clipping planes 792 and 794 provides a clean transition in capturing information about the target, without overlap or gaps in the recorded information. Capture plane 725 also has a more distant clipping plane 796, which in FIG. 7B is depicted as being more distant from the capture track 730 than is the hologram plane 770. In FIG. 7B, the capture planes 715 and 725 are on the same side of the hologram plane 770, whereas in FIG. 7A (and the corresponding FIG. 9A) the image surfaces 715 and 725 are on opposite sides of the hologram plane. In FIGS. 7A, 7B, 9A, and 9B, both capture (or image) planes are spatially distinct from the hologram plane. In another embodiment, one of the capture or image planes can coincide with the hologram plane as long as at least one other capture or image plane is spatially distinct from the hologram plane.

As indicated in FIGS. 7A and 7B, a plurality of capture surfaces are used. The corresponding surfaces that are used for display of the holographic stereogram are a plurality of image surfaces, such as are described in conjunction with FIGS. 8A and 8B relating to the computation of the holographic stereogram components, and in conjunction with FIGS. 9A and 9B relating to the display of the holographic stereogram.

Figure 8:
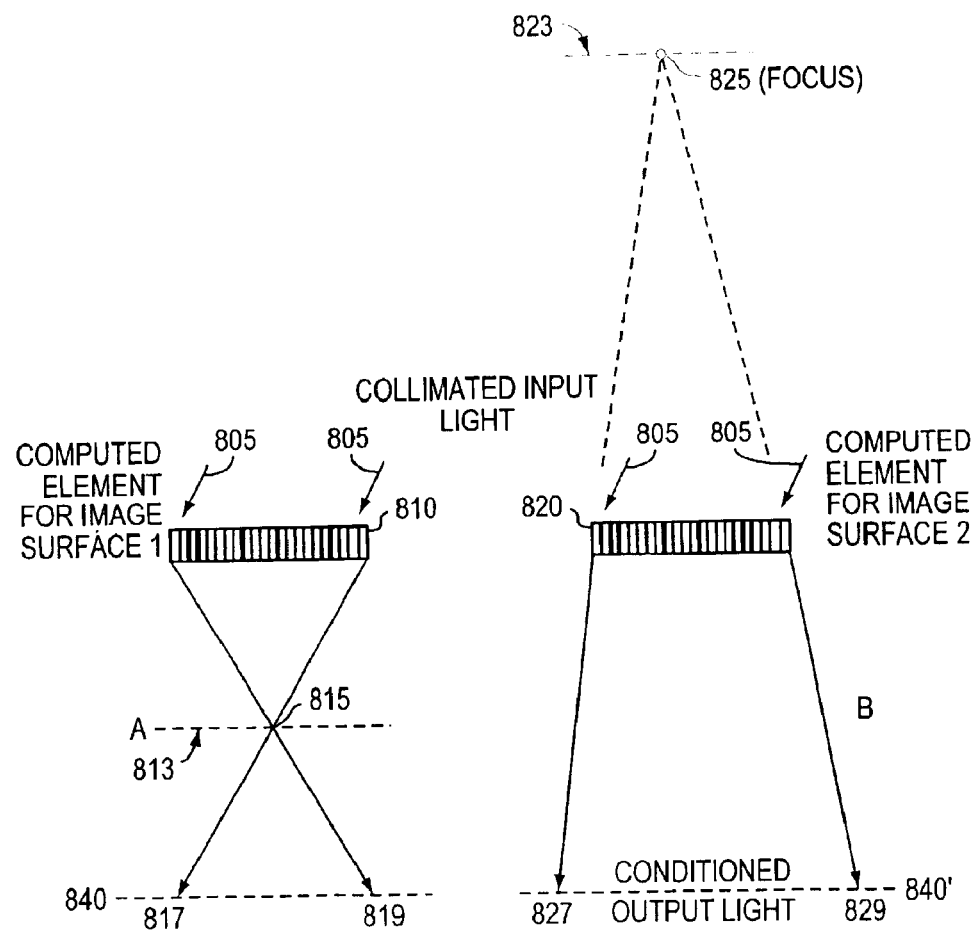
FIGS. 8A–8B are schematic diagrams that depict an illustrative computed diffractive element array using two non-collocated image surfaces that redirect light, according to principles of the invention.

FIGS. 8A–8B depict an illustrative computed diffractive element array using two non-collocated image surfaces that redirect light. Collimated input light 805 coming from the same direction impinges on the diffractive element array in each of FIGS. 8A–8B. Diffraction of electromagnetic radiation occurs according to the Bragg diffraction condition. The first diffractive element 810 shown in FIG. 8A is adapted to diffract the light to impinge on a series of locations situated between positions 817 and 819, as illustrated. As shown in FIG. 8A, the diffracted light from the first diffractive element 810 comes to a focus at point 815, so that the light impinging at locations between locations 817 and 819 appears to originate at a point situated on a surface corresponding to the location indicated by dotted line 813.

In FIG. 8B, the diffractive element 820 is adapted to diffract the impinging light at a different angular range such that the light impinges at positions in the locations from 827 to 829. The light that impinges at locations from 827 to 829 appears to emanate from a point focus at point 825, situated behind the diffractive element, on a surface indicated by the dotted line 823. The methods and systems of the invention employ at least one image surface, such as surface 813 or surface 823, that is spatially distinct from the surface where the interference pattern is present (called the hologram surface), a viewzone indicated in FIG. 8A by the dotted line 840, and in FIG. 8B by the dotted line 840'. The diffractive elements can be designed to diffract different wavelengths to different locations using a constant value of d. Alternatively, the diffractive elements can be designed to diffract the same wavelength to different locations by changing the value of the spacing d at different times, for example.

Figure 9A:
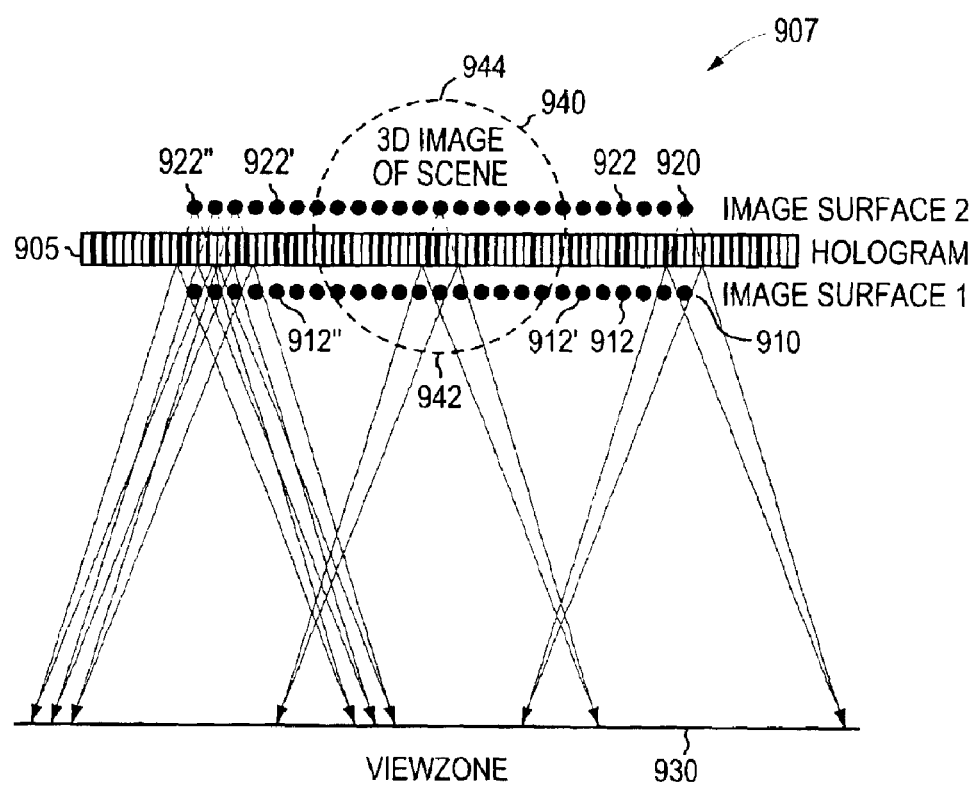
FIG. 9A is a schematic diagram in plan view showing the relationships among the diffractive elements of the holographic stereogram, the image surfaces, the zone from which the viewer views, and the three-dimensional image of the scene or target, according to principles of the invention.
Figure 9B:
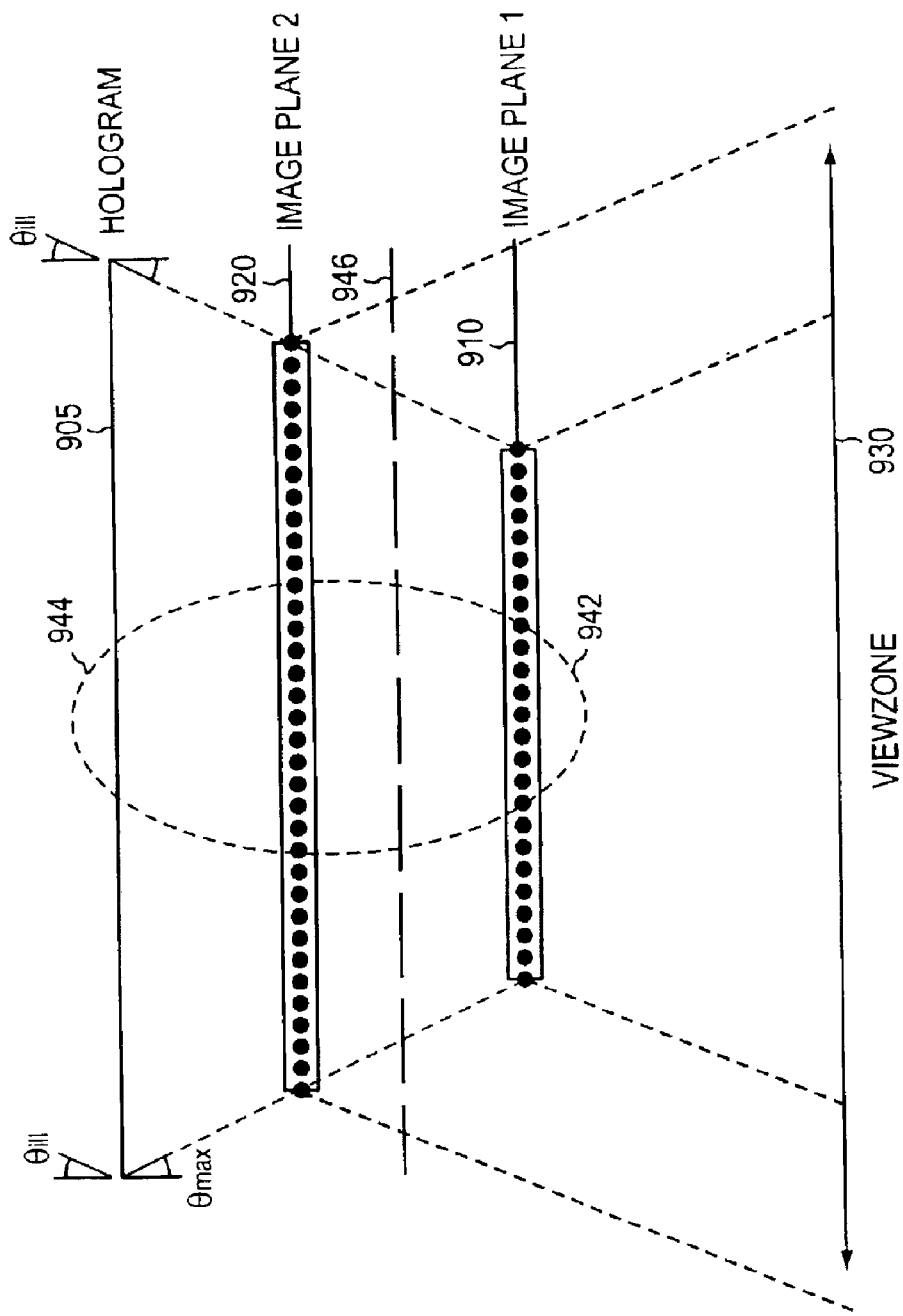
FIG. 9B is another schematic diagram in plan view showing relationships among the elements of the holographic stereogram, according to principles of the invention.

The relationships among the diffractive elements of the holographic stereogram, the image surfaces, the hologram surface, and the three-dimensional image of the scene or target are shown in FIGS. 9A–9B. In overview, FIG. 9A depicts one embodiment of aspects of the systems and methods of the invention relating to the display of the holographic stereogram. In FIG. 9A, light impinges on the hologram surface 905 of the holographic stereogram, for example from a direction indicated by arrow 907. The impinging light drives the diffractive display associated with a first image surface 910. As indicated in FIG. 9A, the first image surface 910 is comprised of the series of dots 912, 912', 912" focused by the hologram surface 905. Also, the impinging light drives the diffractive display associated with the second image surface 920. As indicated in FIG. 9A, the second diffractive surface 920 is comprised of the series of dots 922, 922', 922" focused by the hologram surface 905. The net effect of the display is that a viewer located in the viewzone 930 viewing the light field projected by the hologram surface 905 sees an apparent three-dimensional image 940. The three-dimensional image 940 is the combination of a three-dimensional image segment 942 that is apparently projected from the first image surface 910, and a second three-dimensional image segment 944 that is apparently projected from the second image surface 920.

In FIG. 9B, the image surfaces 910 and 920 are on the same side of the hologram surface 905, rather than on opposite sides as in FIG. 9A. FIG. 9B also depicts the illumination angle $\Theta_{ill}$, the maximum diffracted angle $\Theta_{max}$, and a clipping plane 946 which is the common clipping plane for the two capture planes used to capture the information needed to generate the two image surfaces or planes 910 and 920.

Comparison of FIGS. 7A and 9A, and 7B and 9B, illustrates that the capture geometry and the display geometry have similar features, such as different image surfaces that are non-collocated, and at least one image surface that is spatially distinct from the hologram surface. The spacings, angular relationships, wavelength or wavelengths of illumination, resolution, number of image surfaces, number of captured views, and relative position of image planes within a capture or display region all play roles in determining features of the holographic stereogram that a viewer sees. In the methods and systems of the invention, many of these variables are subject to control or adjustment by a computer, or by an operator who controls the operation of a computer interactively, during the various operations of capturing two-dimensional images of a target, computing the diffractive elements, assembling the diffractive elements into the holographic stereogram, and displaying the holographic stereogram. The variables can be varied individually or in groups.

Representative hardware that uses the computed diffractive pattern to produce the viewable image, and the associated display process are described below.

Figure 10:
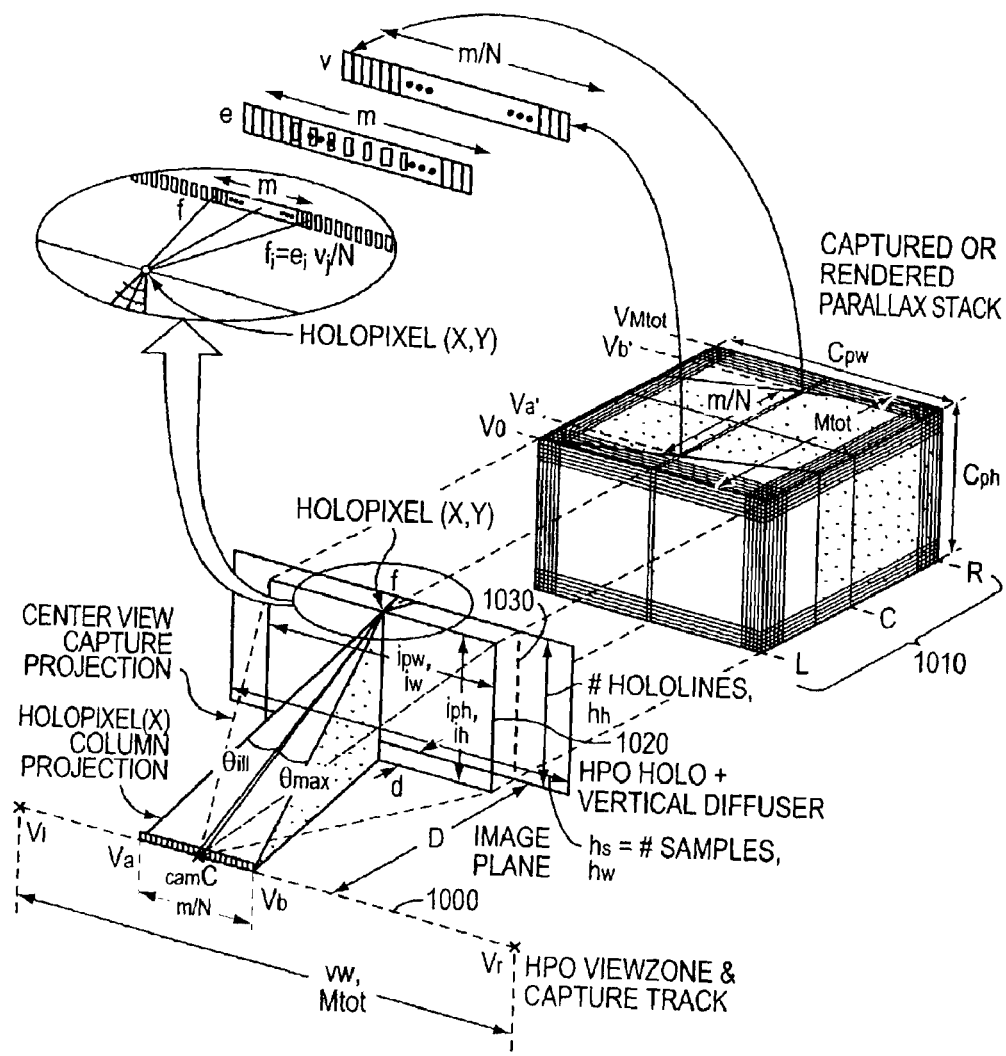
FIG. 10 is a schematic perspective diagram of the geometrical relationships between the object to be depicted in three dimensions, the computed interference pattern used to project the image, and the hologram and image surfaces, according to principles of the invention.

FIG. 10 places the image surfaces shown in FIGS. 9A–9B into perspective, illustrating their cooperation to form a three dimensional image. As indicated above, in the present description, the hologram and image surfaces will be presented as planes. In some embodiments, holographic stereograms of the invention are full parallax holograms. However, for ease of explanation, holographic stereograms having horizontal parallax only (HPO) will be described. Those of skill in the holographic arts will recognize that holographic stereograms having full parallax can be created by capturing two-dimensional images along one or a plurality of capture grids, and processing the images using the principles outlined herein.

In FIG. 10, a capture track is indicated at a line 1000 from point $V_1$ to point $V_r$. As described earlier, there is an object 1010 which is to be reproduced as a holographic stereogram.

For purposes of elucidation, an image plane 1020 is also shown. The image plane 1020 is separate from the hologram plane 1030 by a distanced.

TABLE I

| | |
|---|---|
| $h_w$ | hologram width |
| $h_h$ | hologram height |
| fs | hologram sampling frequency |
| $\Theta_{ref}$ | reference angle |
| $\Theta_{ill}$ | illumination angle |
| $\Theta_{max}$ | maximum diffracted angle |
| $z_{holo}$ | hologram plane z-depth |
| $i_w$ | image plane width |
| $i_h$ | image plane height |
| $z_{img}$ | image plane z-depth |
| $i_{pw} \times i_{ph}$ | number of image pixels |
| $c_w$ | capture plane width |
| $c_h$ | capture plane height |
| $z_{img}$ | capture plane z-depth |
| $c_{pw} \times c_{ph}$ | number of capture pixels |
| $c_{paspect}$ | capture pixel aspect |
| $(v_r-v_l)$ | viewzone width |
| $\Delta_c$ | capture camera increment |
| $M_{tot}$ | total number of views rendered |
| $(v_b'-v_a')$ | views within a holopixel's projection |
| m | total number of samples within a fringe |
| N | pixel replication factor |

RIS holograms are a new kind of computed holographic stereogram, projecting one or more series of parallax views of a three-dimensional scene through one or more holographically reconstructed image planes. An image plane can be specified at any location off of the hologram plane and populated by a variable number of projector-pixels (holopixels). In one embodiment, the systems and methods of the invention provide horizontal-parallax-only (HPO) holograms.

RIS holograms can be efficiently assembled by combining a sweep of acquired or synthesized (captured) parallax views of a scene with instances of a single precomputed diffractive pattern. By recognizing the relationship between the plenoptic sampling of a scene in both capture and diffractive projection, the RIS approach offers flexible tuning of capture and projection together, tailored to the scene, within the limits of a given parallax display.

Systems and methods of the invention provide the ability to specify how much spatial and parallax detail to include, and at which plane or planes to emphasize reconstruction accuracy. In general, systems and methods of the invention permit variation of important capture and projection parameters, focus finite resources where they are most efficiently brought to bear for a given scene, and tailor the reconstructed plenoptic function, which a viewer observes when moving through the hologram viewzone.

An advantage of computed holography is that many of the physical restrictions of optical holographic configurations that employ conventional photo-chemistry-based holography can be lifted. First, the relative positioning of the display and computed slit aperture plane can be adjusted freely without the constraints of physical lenses. Furthermore, the size, resolution, and aperture shape of the slits are predominantly computational constructs and can be varied for experimentation, image optimization, and distortion compensation. The flexibility of RIS holograms enhances their usefulness for studying the characteristics of parallax displays.

Image-based rendering and synthetic holography suggest extensions to electro-holography that RIS holograms can readily display. Some sampling models map directly into the domain of holographic stereograms. One model, until now unrealized, approximates the parallax of a scene using several planes of synthetic apertures.

In one embodiment, the systems and methods of the RIS hologram use image planes at various depths to approximate different parts of a scene. These systems and methods combine the computational efficiency of stereographic approximation with the reconstruction fidelity associated with fully-computed techniques and volumetric displays in general. In these embodiments, RIS holograms eliminate the sharp distinctions between two distinct computational techniques and two different classes of three-dimensional displays.

Many adjustable parameters in the RIS systems and methods are interdependent and can advantageously be tuned together to provide optimal sampling and reconstruction of variable scene geometry. In practice, the process of generating a RIS hologram or a RIS hologram animation begins by considering some fundamental constraints imposed by the specification of a particular display. With reference to FIGS. 10 through 16, typical specifications for a holographic display include the sampling frequency $f_s$, the illumination angle $\Theta_{ill}$, the maximum diffracted angle $\Theta_{max}$ (implied by $f_s$ and $\Theta_{ill}$), a hologram area and angle (the latter also implied by $\Theta_{ill}$ and $f_s$), the horizontal and the vertical spatial resolution, the bit depth, and for HPO systems, the viewing distance $D_v$.

In one embodiment, one begins by positioning and orienting a particular three-dimensional scene with respect to the viewer, and works backward to configure interrelated capture and projection parameters for optimal reconstruction. The application of this embodiment to HPO systems is described hereafter. Those of skill in the art will appreciate that the RIS approach applies also to computation for full parallax systems.

In HPO displays, the viewzone is typically a fixed distance from the hologram plane. This constraint is often defined by the display apparatus. The constraint obliges a designer to situate the reconstructed image volume with respect to the hologram plane and viewer, and choose a suitable image plane size and z-depth. The term z-depth refers to the distance of the image plane from the viewzone. The maximum width $i_{wmax}$ that can be ascribed to the image plane depends on its depth $z_{img}$, the hologram width $h_w$, and both $\Theta_{ill}$ and $\Theta_{max}$, according to equation (4):

$$i_{max} = h_w - (z_{img} \tan\Theta_{ill} - z_{img} \tan\Theta_{max}) \tag{4}$$

The maximum image plane height $i_{hmax}$ in an HPO system is simply proportional to the hologram's height $h_h$ and the hologram's distance $z_{holo}$ from the viewzone, as expressed in equation (5):

$$i_{hmax} = (z_{img}/z_{holo})h_h \tag{5}$$

Figure 11A:
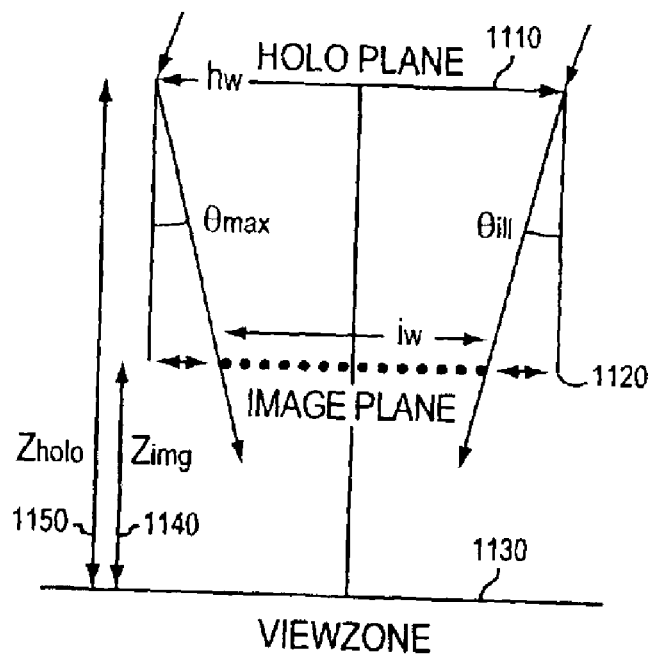
FIGS. 11A and 11B are, respectively, top and side elevation sections through the projection geometry of the methods and systems of the invention as depicted in FIG. 10, according to principles of the invention.
Figure 11B:
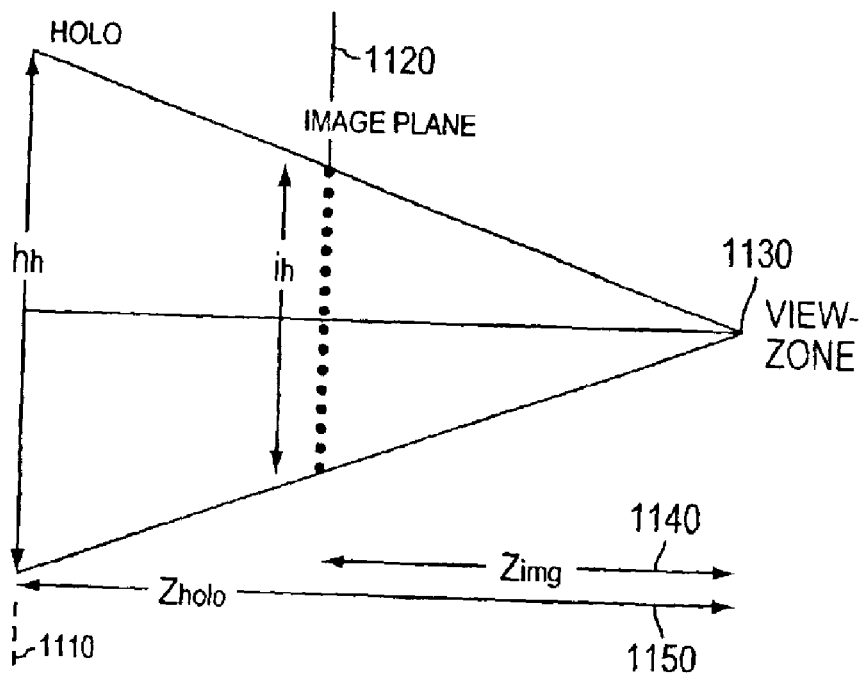

FIGS. 11A and 11B, which are respectively top and side elevation sections through the projection geometry of the methods and systems of the invention as depicted in FIG. 10, show the relationships between a hologram plane 1110, a spatially distinct image plane 1120, and the viewzone 1130. The image depth 1140 and the hologram depth 1150 are also shown.

In a preferred embodiment, the scene geometry is appropriately scaled with respect to the corresponding volume boundaries in the capture geometry. FIGS. 12A and 12B are diagrams showing the scaling relations between a projection geometry and a capture geometry. In FIGS. 12A and 12B a scale factor S expresses the transformation between an image plane width $i_w$ and a capture plane width $i_w/S$. Similar relationships occur between the image and capture pixel spacing, 1220, 1222, the image and capture depth, 1230, 1232, and the image and capture viewzone width 1240, 1242.

To avoid distortion in the final display, the geometries that describe capture and projection should be identical to within a scale factor S, as is presented in FIGS. 12A and 12B. The linear track over which parallax is sampled can be determined based on known parallax resolution. The capture plane width $c_w$ and depth $z_c$, the display's illumination angle, $\Theta_{ill}$, and maximum diffracted angle, $\Theta_{max}$, determine the capture track width $t_w$, given by the equation (6):

$$t_w = c_w + z_c(\tan\Theta_{ill} + \tan\Theta_{max}) \qquad (6)$$

The number $M_{tot}$ of parallax views that must be included in the capture process is given by equation (7):

$$M_{tot} = t_w/\Delta_C \qquad (7)$$

where $\Delta_C$ is a step size for camera displacement in the capture process. Since capture geometry is identical to the projection geometry to within a scale factor S, the corresponding display viewzone width $v_w$ is given by equation (8):

$$v_w = St_w \qquad (8)$$

There are no limits on S.

A preferred method of placement of the image plane is within the depth of field of the reconstructed scene. In one embodiment, situating a single image plane far in front of the hologram plane locates much of the reconstructed image in front of the hologram plane as well. If the image plane is located with only a slight separation from the hologram plane, the reconstructed image volume generally will straddle the hologram plane. In some embodiments, a plurality of image planes located at different z-depths are employed. The choice of image plane z-depth can impact various aspects of reconstructed image quality, because of the way RIS holograms are constructed. Some of the aspects include brightness and dynamic range, scene clipping, and image blur and aliasing.

Brightness and Dynamic Range: Other things being equal, brightness and dynamic range will be inversely related to the distance between the image plane and the hologram plane. As will be described in greater detail below, a greater distance between the image and hologram planes requires more samples in the fringe used to reconstruct holopixels. In turn, more fringe overlap on the hologram means that more holopoints must share the limited dynamic range available in each hologram sample. A region of the hologram which accumulates contributions from many holopoints will consequently represent each of their individual fringes with less modulation depth. Reduced modulation depth per elemental fringe can lead to diminished overall brightness and compressed greyscale in the corresponding holopixel.

Scene Clipping at Viewzone Extremes: Other things being equal, a greater distance between image and hologram planes constrains the image plane's spatial extent. Consider a left-most holopixel on the image plane. The holopixel's brightness will diminish in comparison to other holopixels to the extent that its respective fringe bleeds off of the left-most side of the hologram. The image plane effectively provides a "window" on the scene. A narrower window clips some scene information located well behind it, especially at extreme positions of the parallax sweep.

Image Blur and Aliasing: Other things being equal, a greater distance between image and hologram planes produces a scene with greater blur or alias. The parts of the scene directly on the image plane will reconstruct with the greatest spatial accuracy. The parts far from the image plane will reconstruct less accurately, and may appear either blurry or even aliased in reconstruction. Depending on the scene depth and the reconstruction quality desired, it may be advantageous to use one or more than one image plane.

As will be explained further below, the image plane has the sharpest focus in reconstruction. A capture plane corresponding to an image plane has the best rendering/capture quality. In general, according to principles of the invention, the image volume preferably straddles the image plane of the display. The exact placement of the image plane within the volume is analogous to the hyperfocal distance in photography used to minimize blur of objects lying between two depths. According to principles of the invention, situating an image plane fixes a good corresponding capture plane during parallax view recording. In one embodiment, one situates the reconstructed scene volume in depth, and then sets the image plane depth $z_{img}$ according to equation (9):

$$1/z_{img} = (1/z_{far} + 1/z_{near})/2 \qquad (9)$$

where $z_{near}$ and $z_{far}$ are distances from the viewer's eye to the nearest and farthest extents of the scene volume.

Once the image capture geometry has been designed to match the geometry of the display system, parallax and spatial sampling frequencies are chosen based on constraints imposed by the display, the capture process, the scene and the human observer. The methods and systems of the invention determine the maximum pixel spacing that satisfies two requirements. First, the perception of a continuous image plane is important to provide a realistic image. This requirement tends to decrease the pixel size and increase the number of pixels in the image. Second, the effective sampling of a given scene's geometry and texture in light of the Nyquist condition sets a lower bound for the number of pixels needed to avoid aliasing.

While the capture plane is populated by an array of pixels, the projection plane may be populated by elements that do not have the same spatial extent as pixels, depending on what kind of diffractive pattern is employed. Here, holopixels are specified as points whose spatial extent depends on the display architecture. In one embodiment, points having infinitesimally small extent are selected. A horizontal holopixel spacing is selected that ensures that the gaps between pixels are imperceptible. The appropriate horizontal pixel spacing in the capture plane is computed. A multiplicity of points produces the appearance of a continuous surface. The general limit of human visual acuity can serve as a guide. For example, if holopixels appear as sharply focused points on the image plane, and two points separated by one minute of arc are barely distinguishable, the maximum horizontal holopixel spacing $\Delta_{hp}$ is determined from equation (10):

$$\Delta_{hp} = z_{img} \tan(1/60)° \qquad (10)$$

The system and method then determine the capture resolution required to effectively sample the scene's geometrical and textural detail. From the Nyquist sampling condition, $1/\Delta_{hp}$ must be at least twice the highest spatial frequency contained in the scene's projection on the capture plane. $\Delta_{hp}$ is desirably chosen so that these requirements are satisfied.

In an HPO system, maximum holopixel spacing in the vertical direction is constrained by the display's vertical resolution. The image plane represents a row of holopixels either at each vertical display line, or at each line within some subset of display lines. The total number of holopixels populating the image plane, which is identical to the number of pixels in the capture plane if S'=1, is given by equations (11a, 11b):

$$i_{pw} = c_{pw} \quad (11a)$$

$$i_{ph} = c_{ph} = f(\text{display}) \quad (11b)$$

The capture pixel aspect ratio is given by equation (12):

$$c_{paspect} = (c_w c_{ph})/(c_h c_{pw}) \quad (12)$$

The systems and methods of the invention determine the required parallax sampling frequency and filtering method to accurately represent the three-dimensionality of the imaged scene's light field. The sampling frequency directly affects the horizontal spatial resolution of objects at different depth planes within the imaging volume. At the image plane, for instance, horizontal spatial resolution is determined as described above. At all other depth planes, the maximum horizontal spatial frequency falls off linearly as a function of distance at a rate inversely dependent on the rate of parallax sampling. The shallower an object of fixed spatial resolution is, the lower the rate of parallax sampling can be.

Figure 13:
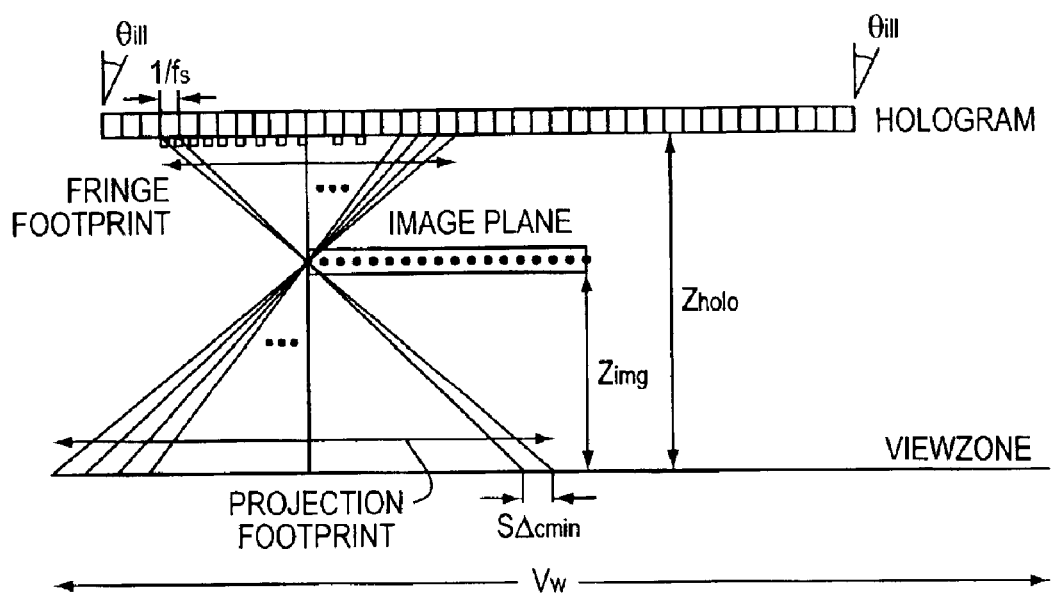
FIG. 13 is a diagram that schematically shows how a bound for a camera spacing step is specified, according to principles of the invention.

In RIS hologram creation, the parallax sampling rate varies over a wide range based on several constraints. For conventional display technology, the maximum possible parallax resolution allowed by the display itself corresponds to thousands of perspective views of the scene. This is illustrated in FIG. 13, which shows how a limit for a camera spacing step is specified by the hologram sampling frequency $f_s$, $z_{holo}$, and $z_{img}$. In particular, the minimum capture camera spacing $\Delta C_{min}$ that a fringe can support is defined by the trigonometric equation (13):

$$\Delta C_{min} = z_{img}/(Sf_s(z_{holo} - z_{img})) \quad (13)$$

In practical systems, the sampling rate exceeds that required for typical objects. The sampling rate can be reduced to minimize the computational requirements for view synthesis. Alternatively, the object being imaged may have known, fixed spatial resolution limits that determine the parallax sampling rate. Finally, the image acquisition method itself can limit the number of views acquired.

An insufficient parallax sampling frequency results in aliasing of the reconstructed image. Aliasing artifacts appear as low frequency bars overlapping details of the object. The aliasing destroys the three-dimensional effect of the image. Proper sampling of the maximum parallax resolution of a scene as shown in FIG. 13 can be obtained using lens blur or volume filtering techniques.

Proper position of the image plane within the image volume, minimizing $z_i - z_n$ or $z_i - z_f$, also helps to minimize aliasing artifacts. Positioning the image plane at the hyperfocal distance within the volume minimizes the parallax resolution required to represent the volume or, conversely, minimizes the blur required to bandlimit the volume to a fixed parallax resolution. A more complete analysis of this relationship is given in the literature.

Using the image plane depth $z_{img}$, $\Theta_{ref} = \Theta_{ill}$ and $\Theta_{max}$, the system and method precomputes the single holographic fringe which will be used to project scene parallax through each holopixel location. For example, if each holopixel at depth $z_{img}$ is an HPO projector of a cylindrical wave in the x-z plane, its one dimensional elemental fringe pattern e(x) is computed as the interference of a cylindrical wave with a plane reference wave in this plane. This computation can be approximated by equation (3), where r(x) is the radius of curvature of a wave originating at (x=0, $z=z_{img}$), and x is evaluated at sample locations across the hologram.

The fringe is computed over a span of hologram samples bounded by the location where interference produces a spatial frequency equal to zero, and the location where the spatial frequency reaches a maximum permissible value $f_{max}$. The Nyquist sampling condition requires that the maximum spatial frequency $f_{max}$ contained in a fringe be less than half the hologram sampling frequency $f_s$. The fringe preferably is filtered to eliminate sharp discontinuities at its boundaries. $f_{max}$ is related to the maximum diffracted angle $\Theta_{max}$, by equation (14):

$$f_{max} = (\sin\Theta_{ill} - \sin\Theta_{max})/\lambda \quad (14)$$

The number of samples m contained in the fringe is determined from the geometrical relationship specifying its "footprint" on the hologram by equation (15):

$$m = (z_{holo} - z_{img})(\tan\Theta_{max} + \tan\Theta_{ill})/\Delta_s \quad (15)$$

where $\Delta_s$ is the hologram sample spacing. A holopixel that reconstructs farther from the hologram plane is specified by a fringe with a larger footprint, and hence more samples. The fringe for a holopixel located closer to the hologram plane has a smaller footprint and fewer samples.

No single holopixel projects to the entire viewzone because of limits imposed by the hologram sampling frequency. The projection geometry of a holopixel specifies which, and how many parallax views the holopixel's fringe can multiplex given the capture camera spacing $\Delta_C$. The parallax sweep of one holopixel is also indicated in FIG. 13.

The sweep of individual parallax views is acquired by moving the camera from one side of the camera track to the other, capturing $M_{tot}$ views in increments of $\Delta_C$. The views are ordered. Individual views may be optically or electronically captured, or rendered using any suitable computer graphics techniques. The resulting "stack" of parallax views collectively represents the scene geometry's projection from many locations along the capture track onto the same capture plane, as resolved by its pixels. This stack contains $c_{pw} \times c_{ph} \times M_{tot}$ samples.

Figure 14:
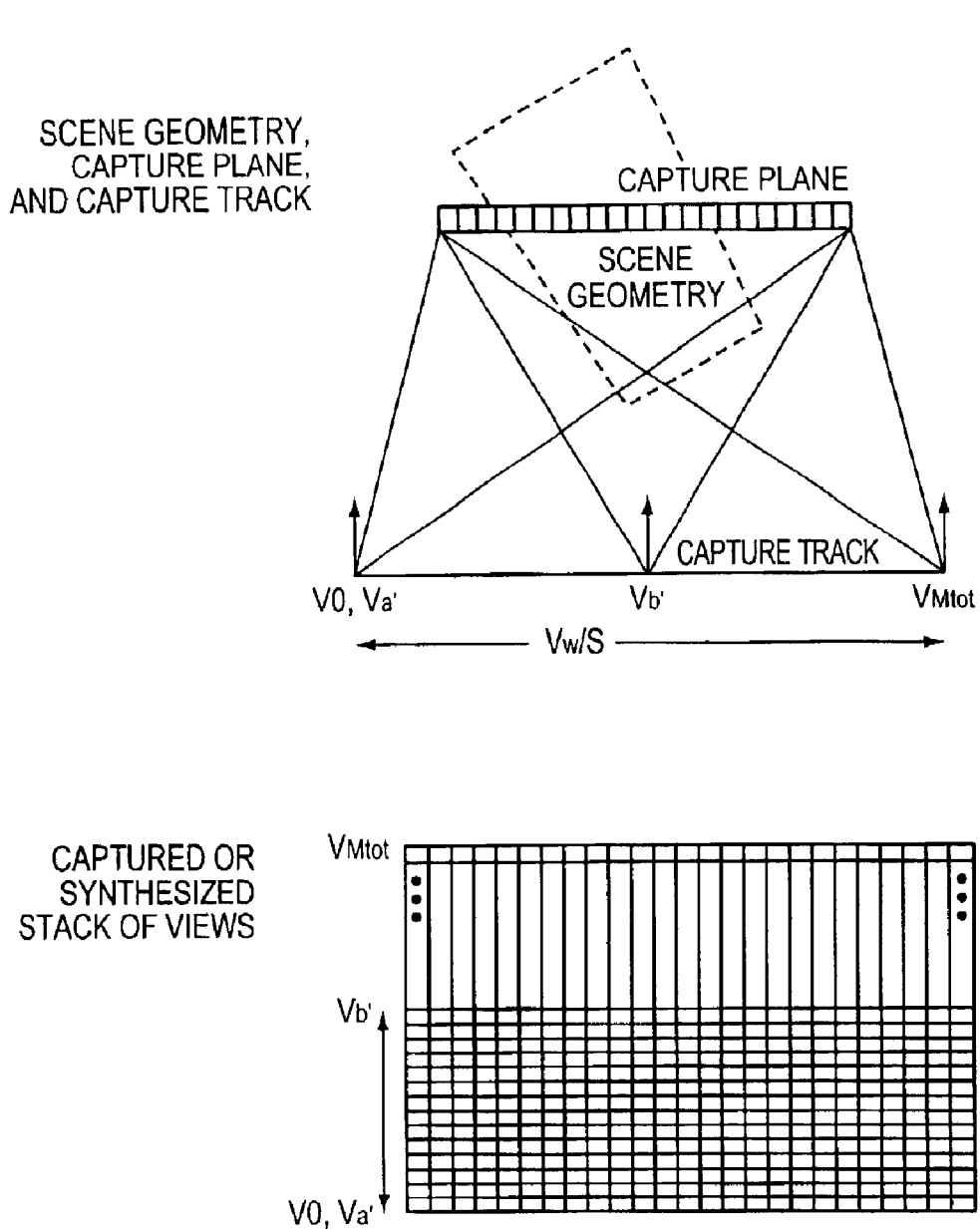
FIG. 14 is a schematic diagram that illustrates the capture process, and the stack of parallax views, according to principles of the invention.

The capture process is illustrated in FIG. 14, which also shows the stack of parallax views. The set of values recorded at a single pixel throughout the entire parallax sweep (a one-pixel slice through the stack) represents not only what that pixel captured, but also what its corresponding holopixel will angularly project. Since the capture and projection geometries have been carefully matched, image plane holopixels should multiplex the scene geometry along substantially the original capture directions.

Figure 15:
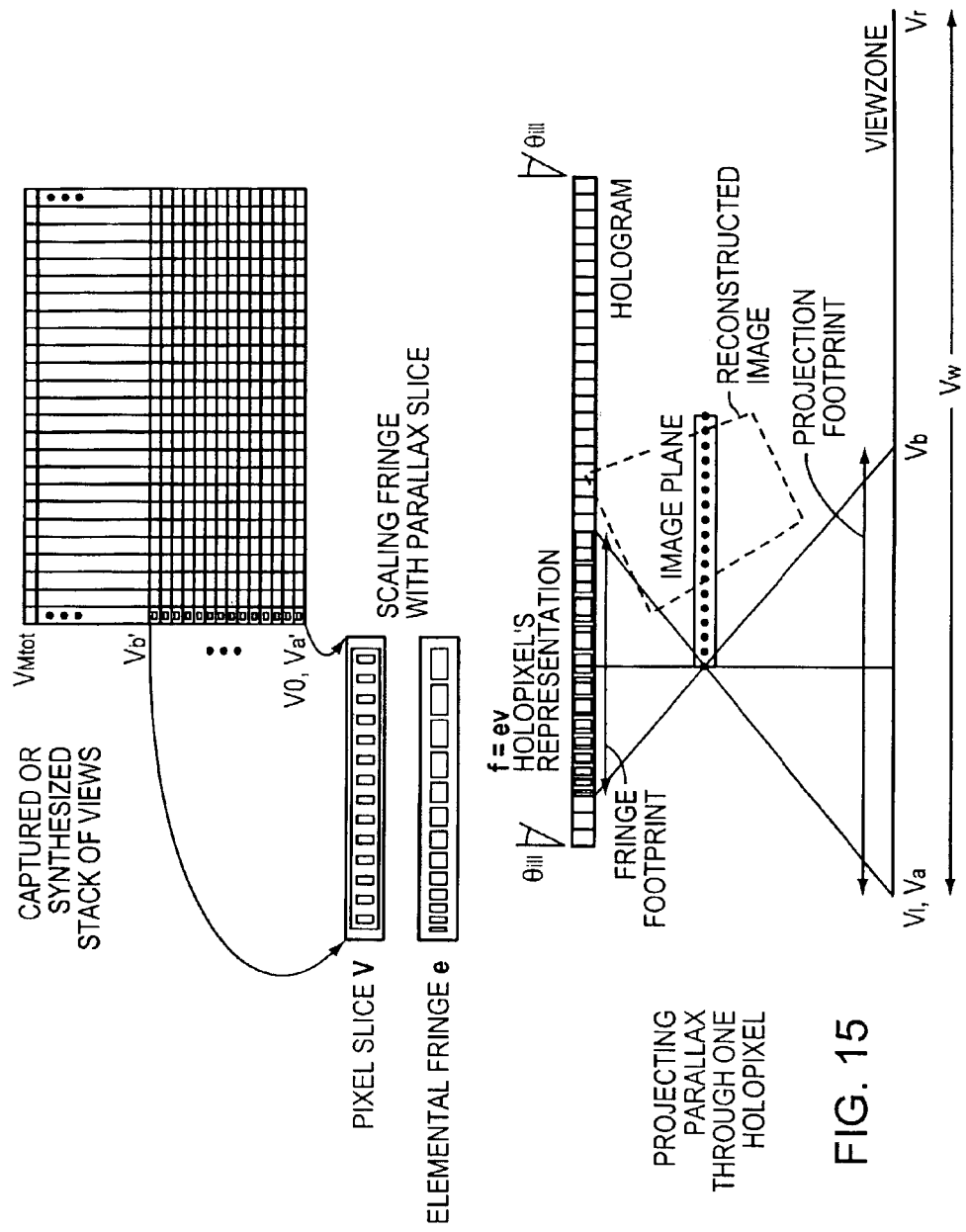
FIG. 15 is a diagram showing in plan view the interrelationships among the hologram plane, the image and capture planes, and the captured stack of views, according to principles of the invention.

FIG. 15 shows the interrelationship among the hologram plane, the image and capture planes, and the captured stack of views depicted in FIGS. 13 and 14. The entire image plane is populated by a spatial array of holopixels that corresponds to the capture pixel array. Each holopixel's horizontal position is randomly jittered, by at most a small fraction of the holopixel spacing, in order to interrupt their spatial regularity and thereby avoid distinct and undesirable diffraction artifacts in reconstruction. Each holopixel in the image plane is specified by the same elemental fringe pattern C. Each holopixel's elemental fringe is scaled in amplitude by a slice v through the parallax view volume at the corresponding capture pixel. The vector f=ev is accumulated into the hologram to represent a holopixel projecting the appropriate parallax information, as shown in FIG. 15.

As indicated in FIGS. 13 and 14, each holopixel can usually project back toward only a limited span of all the capture locations, and thus actually multiplexes only a subset of the values in its parallax slice. The range of pixel values a holopixel can project is a function of its position (x, $z_{img}$) and its projection geometry. The projection boundaries $v_a$ and $v_b$ of a holopixel in the viewzone is determined by equations (16a, 16b):

$$v_a = x - z_{img} \tan\Theta_{ill} \quad (16a)$$

$$v_b = x + z_{img} \tan\Theta_{max} \quad (16b)$$

The ordinal number of the left-most $v_a'$ and right-most $v_b'$ views included in a holopixel's projection are given by equations (17a, 17b):

$$v_a' = (v_a - v_l) S \Delta c \quad (17a)$$

$$v_b' = (v_b - v_l) S \Delta_c \quad (17b)$$

where $v_l$ is the leftmost extent of the viewzone. In an HPO display, $v_a'$ and $v_b'$ are determined for each column of holopixels in the image plane, and the appropriate slice through the stack of parallax views is indexed accordingly to these computed offsets. The manner in which individual holopixels multiplex these limited spans of parallax is illustrated in FIG. 10. If a shearing-and-recentering capture window or recording plane is used to generate the image volume, only the pixels within a diagonal swath of width= $|v_b - v_a|$ and height=$i_h$ through the image volume need to be captured. Pixel values outside this region are not multiplexed by any holopixel. If a translating capture window or recording plane is used to generate the image volume, regular orthogonal slices of the image volume will be multiplexed by holopixels instead.

Spans are used to scale the fringes of corresponding holopixels. If the number of values $v_b' - v_a' + 1$ contained in a parallax span is less than the number of fringe samples m, because parallax has been sampled more coarsely than the hologram, each value in the span is used to scale $N = m/(v_b' - v_a' + 1)$ adjacent fringe samples. This projects each value over a wider extent in the viewzone.

The hologram representing the image plane is assembled by accumulating the sum of the translated, amplitude-scaled fringes. Many spurious diffraction artifacts are eliminated in the diffracted field by windowing the precomputed fringe, by randomly spatially jittering the holopixels, and by overlapping the fringes of neighboring holopixels on the hologram plane rather than sharply abutting one another. When viewed from the correct viewing location, the final image appears metrically correct and without aliasing.

One embodiment of the RIS hologram computation was designed for a particular display, the MIT second-generation holographic video display device (holovideo), which has been described previously by St.-Hilaire et al. in "Electronic display system for computational holography," SPIE Vol. 1212, Practical Holography IV (1990), and by St.-Hilaire in "Scalable Optical Architectures for Electronic Holography," Ph. D. Thesis, Program in Media Arts and Sciences, Massachusetts Institute of Technology (1994). This system is capable of displaying 36MB, monochromatic, HPO images and should be viewed from a distance of 600 mm. The hologram is modeled as 150 mm (and 256K samples) wide by 57.5 mm (144 hologram lines) high, illuminated at $\Theta_{il} = -15$ degrees, and diffracting a maximum angle of $\Theta^{max} = 14$ degrees.

Multiple viewpoint rendering (MVR) is used to generate views efficiently. MVR has been described by Halle, in "Multiple Viewpoint Rendering for 3-Dimensional Displays," Ph.D. Thesis, Program in Media Arts and Sciences, Massachusetts Institute of Technology (1997). MVR can rapidly interpolate a sweep of parallax views based on the underlying scene geometry and shading. MVR directly computes slices through the parallax stack, from which individual views can later be assembled as required in an application. The parallax slices serve advantageously for RIS hologram computing. The speed and efficiency of MVR also permits incorporation of as many parallax views as may be required, without suffering prohibitive rendering times. Once a scene is spatially arranged and both capture and projection are configured, a stack of views is efficiently rendered, even when high spatial and parallax resolutions are specified.

Figure 16:
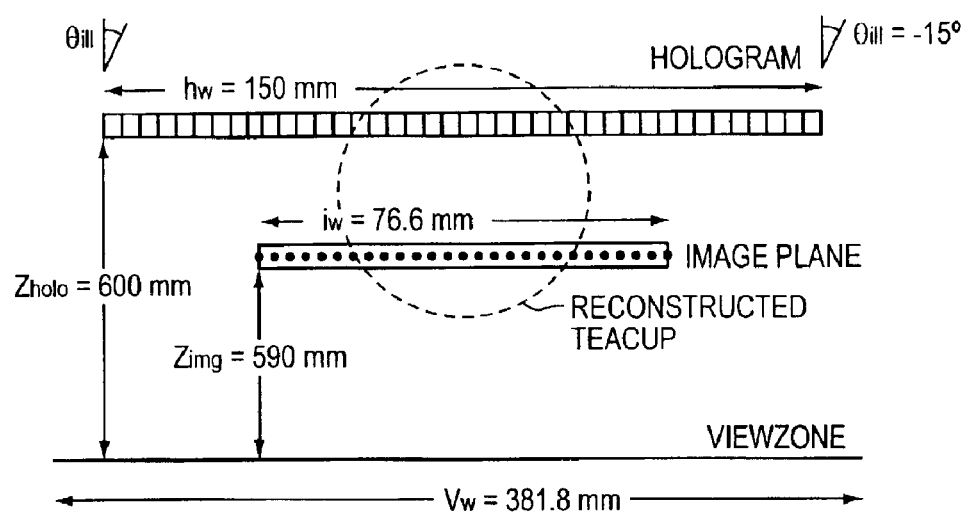
FIG. 16 is an illustrative schematic diagram showing a plan view of the geometry and layout used to generate holographic stereograms of a teacup, according to principles of the invention.

An illustrative example of the geometry and layout used to generate holographic stereograms of a teacup is shown in FIG. 16. In one embodiment, the scene is described by a texture mapped polygonal teacup containing roughly 500K triangles. Identical projection and capture geometries are used, in which unity scale factors (S=1, and S'=1) and the configuration described by the parameters given in Table II applies.

TABLE II hologram width $h_w$ = 150 mm
hologram height $h_h$ = 57.5 (144 hologram lines)
hologram sampling freguency $f_s$ = 1747 samples/150 mm
reference and illumination angle $\Theta_{ref} = \Theta_{ill} = -15$ degrees
maximum diffracted angle $\Theta_{max}$ = 14 degrees
hologram plane z-depth $z_{holo}$ = 600 mm
capture/image plane width $c_w = i_w$ = 76.66 mm
capture/image plane height $c_h = i_h$ = 57.5 mm (144 hologram lines)
capture/image plane z-depth $z_{img}$ = 590 mm
capture/image pixel resolution ($c_{pw} = i_{pw} \times c_{ph} = i_{ph}$)$_{-(383 \times 144)}$
capture pixel aspect $c_{paspect}$ = 2.6597
viewzone width $(v_r - v_l)_{-381.8\,mm}$
capture camera increment $\Delta_c$ = 0.3376
total number of views rendered $M_{tot}$ = 1131
views within a holopixel's projection $(v_b' - v_a')$ = 904
total number of samples within a fringe m = 9040
pixel replication factor N = 10

The elemental fringe to reconstruct a holopixels 10 mm in front of the hologram plane is computed and filtered by a Blackman Window given by equation (18):

$$w(n) = 0.42 + 0.5 \cos(2\pi n/m) + 0.08 \cos(4\pi n/m) \quad (18)$$

The scene geometry is arranged to straddle the image plane as shown in FIG. 16. A shallow image such as a teacup does not require 9040 parallax views. Different numbers of views, and different image depths have been investigated to demonstrate features of the invention. In one embodiment, 50 parallax views are captured. No visible difference in reconstruction is perceived. The parallax views can be generated efficiently using the MVR algorithm.

The reconstructed image can contain artifacts introduced by the display architecture. The image can manifest grey-scale compression. RIS hologram computing in accordance with the present invention successfully generates a three-dimensional image that appears metrically correct and free of any noticeable diffraction artifacts introduced by the process.

EQUIVALENTS

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A computer-generated holographic stereogram comprising a hologram surface on which interference patterns are produced, the interference patterns reconstructing an image surface, spatially distinct from the hologram surface, through which an image is projected, wherein the holographic stereogram is computed by obtaining a diffractive fringe vector e and a pixel slice v through a stack of views by which a three-dimensional objector scene has been captured or synthesized and generating a corresponding holopixel representation f=ev.

2. The holographic stereogram of claim 1, wherein the hologram surface and the image surface are separated by an adjustable distance.

3. The holographic stereogram of claim 1, wherein the image surface has a depth and a resolution, at least one of the image surface depth and resolution being variable.

4. The holographic stereogram of claim 1, wherein a scene parallax resolution is variable.

5. The holographic stereogram of claim 1, wherein the image is an image displayed using visible light.

6. The holographic stereogram of claim 1, wherein the image is an image displayed in color using visible light.

7. A computer-readable medium in which are stored data representative of a diffractive pattern for optically reconstructing a holographic stereogram, the diffractive pattern comprising a plurality of precomputed diffractive bases used to reconstruct holographic primitives in at least one image surface of the holographic stereogram, the holographic stereogram having a hologram surface that is spatially distinct from one of the at least one image surface, wherein the holographic stereogram is computed by obtaining a diffractive fringe vector e and a pixel slice v through a stack of views by which a three-dimensional object or scene has been captured or synthesized and generating a corresponding holopixel representation f=ev.

8. The computer readable medium of claim 7, wherein the plurality of precomputed diffractive bases are individually weighted.

9. The computer readable medium of claim 7, wherein at least two of the plurality of precomputed diffractive bases overlap.

10. An apparatus for displaying computer-generated holographic stereograms, comprising:
   a computer for generating a computed holographic stereogram, wherein the holographic stereogram is computed by obtaining a diffractive fringe vector e and a pixel slice v through a stack of views by which a three-dimensional object or scene has been captured or synthesized and generating a corresponding holopixel representation f=ev;
   a display having a hologram surface on which the holographic stereogram is written; and
   a generating module that reconstructs the holographic stereogram at an image surface that is spatially distinct from the hologram surface.

11. The apparatus of claim 10, wherein the generating module controls a parameter that adjusts a visual manifestation of the holographic stereogram.

12. The apparatus of claim 11, wherein the controlled parameter comprises at least one of an image surface depth, an image surface resolution, a number of image surfaces, and a scene parallax resolution.

13. An apparatus for displaying computer-generated holographic stereograms, comprising;
   a computer for generating a computed holographic stereogram, wherein the holographic stereogram is computed by obtaining a diffractive fringe vector e and a pixel slice v through a stack of views by which a three-dimensional object or scene has been captured or synthesized and generating a corresponding holopixel representation f=ev;
   a display upon which a holographic stereogram is displayable; and
   a generating module that generates a diffractive pattern comprising a plurality of precomputed diffractive bases used to reconstruct holographic primitives in one or more image surfaces of the holographic stereogram.

14. The apparatus of claim 13, wherein the plurality of precomputed diffractive bases are individually weighted.

15. The apparatus of claim 13, wherein at least two of the plurality of precomputed diffractive bases overlap.

16. A method of displaying a computer-generated holographic stereogram, comprising the steps of:
   computationally generating a diffractive pattern for displaying a holographic stereogram, wherein the holographic stereogram is computed by obtaining a diffractive fringe vector e and a pixel slice v through a stack of views by which a three-dimensional object or scene has been captured or synthesized and generating a corresponding holopixel representation f=ev;
   producing the diffractive pattern to image at least one image surface at a location that is spatially distinct from a hologram surface; and
   displaying the resulting holographic stereogram to reconstruct the at least one image surface.

17. The method of claim 16, further comprising the step of adjusting a location of at least one image surface relative to a location of the hologram surface.

18. A method of displaying an adjustable computer-generated holographic stereogram, comprising the steps of:
   computationally generating a diffractive pattern for displaying a holographic stereogram, wherein the holographic stereogram is computed by obtaining a diffractive fringe vector e and a pixel slice v through a stack of views by which a three-dimensional object or scene has been captured or synthesized and generating a corresponding holopixel representation f=ev;
   determining a visual manifestation of the holographic stereogram reconstruction by adjustment of an adjustable parameter associated with the diffractive pattern of the holographic stereogram; and
   reconstructing the holographic stereogram to produce an image surface.

19. The method of claim 18, wherein the adjustable parameter is a selected one of an image surface depth, an image surface resolution, a number of image surfaces, and a scene parallax resolution.

20. A method of displaying a computer-generated holographic stereogram, comprising the steps of:
   computationally generating a holographic stereogram using a diffractive pattern comprising a plurality of precomputed diffractive bases that are individually weighted and wherein at least two of the precomputed diffractive bases overlap, the plurality of precomputed diffractive bases being used to reconstruct holographic pixels in at least one non-planar image surface, wherein the holographic stereogram is computed by obtaining a diffractive fringe vector e and a pixel slice v through a stack of views by which a three-dimensional object or scene has been captured or synthesized and generating a corresponding holopixel representation f=ev; and
   displaying the resulting holographic stereogram to reconstruct the at least one image surface.

* * * * *